(12) United States Patent
Sereni et al.

(10) Patent No.: US 8,095,515 B2
(45) Date of Patent: Jan. 10, 2012

(54) APPROXIMATING RELATION SIZES USING FIELD DEPENDENCIES

(75) Inventors: Damien Sereni, Oxford (GB); Pavel Avgustinov, Oxford (GB); Oege de Moor, Oxford (GB)

(73) Assignee: Semmle Limited, Oxford (GB)

( * ) Notice: Subject to any disclaimer, the term of this patent is extended or adjusted under 35 U.S.C. 154(b) by 378 days.

(21) Appl. No.: 12/406,611

(22) Filed: Mar. 18, 2009

(65) Prior Publication Data
US 2009/0240649 A1  Sep. 24, 2009

Related U.S. Application Data

(60) Provisional application No. 61/037,757, filed on Mar. 19, 2008.

(51) Int. Cl.
*G06F 17/30* (2006.01)

(52) U.S. Cl. ........... 707/688; 706/45; 707/772; 707/764

(58) Field of Classification Search ................ 370/252, 370/329, 311, 342; 455/450, 522, 501, 453, 455/436, 63; 706/54, 64, 48; 707/3, 4, 2, 707/101, 5, 772, 764
See application file for complete search history.

(56) References Cited

U.S. PATENT DOCUMENTS

| | | | |
|---|---|---|---|
| 6,405,046 B1* | 6/2002 | Kumaran et al. | 455/453 |
| 6,738,762 B1* | 5/2004 | Chen et al. | 707/719 |
| 6,850,925 B2* | 2/2005 | Chaudhuri et al. | 1/1 |
| 6,938,038 B2* | 8/2005 | Weinberg et al. | 1/1 |
| 7,082,108 B2* | 7/2006 | Hwang et al. | 370/311 |
| 7,254,615 B2* | 8/2007 | Taib et al. | 709/209 |
| 7,277,873 B2* | 10/2007 | Brown et al. | 706/45 |
| 7,363,049 B2* | 4/2008 | Shin et al. | 455/522 |
| 7,529,728 B2* | 5/2009 | Weissman et al. | 1/1 |
| 7,580,941 B2* | 8/2009 | Narasayya et al. | 1/1 |
| 7,756,805 B2* | 7/2010 | Cormode et al. | 706/46 |
| 2008/0039129 A1* | 2/2008 | Li et al. | 455/522 |
| 2008/0188260 A1* | 8/2008 | Xiao et al. | 455/522 |
| 2009/0042582 A1* | 2/2009 | Wang et al. | 455/450 |
| 2009/0175187 A1* | 7/2009 | Jersenius et al. | 370/252 |
| 2009/0286566 A1* | 11/2009 | Lindholm et al. | 455/522 |
| 2010/0029282 A1* | 2/2010 | Stamoulis et al. | 455/436 |
| 2010/0056061 A1* | 3/2010 | Luo et al. | 455/63.1 |
| 2010/0091725 A1* | 4/2010 | Ishii | 370/329 |
| 2010/0099449 A1* | 4/2010 | Borran et al. | 455/501 |
| 2010/0118719 A1* | 5/2010 | Ishii et al. | 370/252 |
| 2010/0195636 A1* | 8/2010 | Nakashima et al. | 370/342 |
| 2010/0296470 A1* | 11/2010 | Heo et al. | 370/329 |
| 2010/0309803 A1* | 12/2010 | Toh et al. | 370/252 |

\* cited by examiner

*Primary Examiner* — James Trujillo
*Assistant Examiner* — Thong Vu
(74) *Attorney, Agent, or Firm* — Jon A. Gibbons; Fleit Gibbons Gutman Bongini & Bianco PL

(57) ABSTRACT

A method and system is provided for computing an approximation of the number of distinct results of a query over a relational data source. The approximation uses information about dependencies between fields of relations, in particular the number of distinct values of a field for each possible value of another field. This information can be obtained by analysis of the data stored in the relational data source, or may be specified as annotations to a database schema. An approximation of the number of results is and the dependencies between fields of each part of the query are computed. The approximation can be used to reorder parts of a query, by using the estimated size of parts to guide reordering. The approximation can further be used to determine which parts of a query are relevant to the evaluation of a subquery, which can be used to guide the magic sets transformation.

30 Claims, 23 Drawing Sheets

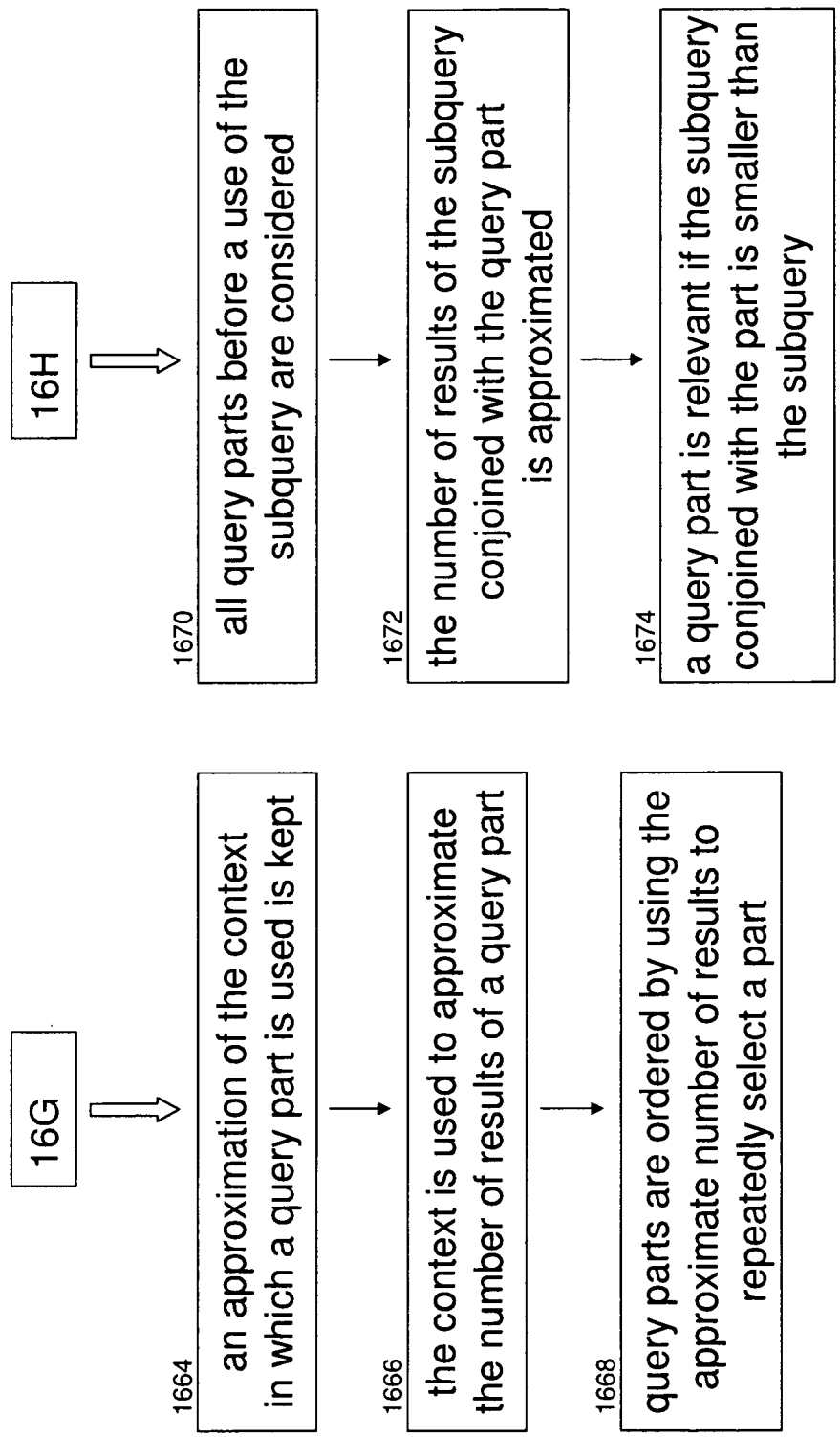

APPROXIMATING RELATION SIZES USING FIELD DEPENDENCIES

CROSS-REFERENCE TO RELATED APPLICATIONS

This application is based upon and claims priority from prior provisional patent application No. 61/037,757, filed on Mar. 19, 2008 the entire disclosure of which is herein incorporated by reference.

FIELD OF THE INVENTION

The present invention generally relates to information retrieval, and in particular the way electronically stored data is accessed via queries that are formulated in a programming language.

BACKGROUND OF THE INVENTION

When an information retrieval system receives a query, that query is typically optimized to ensure its efficient execution. Such optimization involves deciding an order of evaluating parts of a query, and a choice of method for evaluating each part. It is very hard, however, to predict whether one way of evaluating the query is better than another. In traditional database technology, this problem is addressed by making cost estimates, which approximate the resources needed for one particular way of evaluating a query. The optimization engine then chooses an evaluation order and method with a small estimated cost.

These cost estimates are typically based on the characteristics of the query evaluation engine, and also on statistics about the data that is being queried. Cost estimates are often inaccurate because they are based on inaccurate estimates of the size of intermediate results—the size of a result is very important to know when choosing an evaluation method. Furthermore, these cost estimates are highly dependent on the characteristics of the particular system on which they run.

SUMMARY OF THE INVENTION

In one embodiment, a computer-implemented method for approximating a number of results returned by a query over a relational data source is disclosed. The computer-implemented method comprises receiving a number of distinct values in each field of each relation in a relational data source. The distinct values are a size approximation. A plurality of relationships between fields is received. A relationship between a first field and at least a second field is a relationship approximation that approximates a number of distinct values stored in the second field for each value stored in the first field. A query size approximation of the number of distinct values in each field of a result of a query is produced based on the size approximation and the relationship approximation. A query quantity approximation of a total number of distinct records in the result of the query is produced without running the query against the relational data source based on the query size approximation.

In another embodiment, a system for approximating a number of results returned by a query over a relational data source is disclosed. The system comprises a memory and a processor communicatively coupled to the memory. The system also comprises a query approximator communicatively coupled to the memory and processor. The query approximator is adapted to receive a number of distinct values in each field of each relation in a relational data source. The distinct values are a size approximation. A plurality of relationships between fields is received. A relationship between a first field and at least a second field is a relationship approximation that approximates a number of distinct values stored in the second field for each value stored in the first field. A query size approximation of the number of distinct values in each field of a result of a query is produced based on the size approximation and the relationship approximation. A query quantity approximation of a total number of distinct records in the result of the query is produced without running the query against the relational data source based on the query size approximation.

In yet another embodiment, a computer program product for approximating a number of results returned by a query over a relational data source is disclosed. The computer program product comprises instructions for receiving a number of distinct values in each field of each relation in a relational data source. The distinct values are a size approximation. A plurality of relationships between fields is received. A relationship between a first field and at least a second field is a relationship approximation that approximates a number of distinct values stored in the second field for each value stored in the first field. A query size approximation of the number of distinct values in each field of a result of a query is produced based on the size approximation and the relationship approximation. A query quantity approximation of a total number of distinct records in the result of the query is produced without running the query against the relational data source based on the query size approximation.

The various embodiments of the present invention are advantageous because they concern the efficient execution of queries and the approximation of the number of results of a query for use in optimizing queries. The various embodiments of the present invention estimate the size of a relation denoted by a query over a relational data source. This estimate is obtained by a combination of three components: analysis of the data stored in the relational data source; analysis of the database schema and any user-written annotations; and a procedure for computing approximations for queries from approximations of the relations in the data source.

The approximation is obtained by computing a dependency graph for each relation in the data source and each subpart of the query. A dependency graph records the estimated sizes of fields of a relation, together with the estimated dependencies between fields. The use of dependencies between fields is a radical departure from conventional systems, and allows for a precise, yet efficient, procedure for estimating the size of a relation. Dependency graphs may also track equalities between fields of relations to increase precision.

The approximation of sizes of relations may be used to guide optimizing transformations of queries, in particular but not limited to situations in which such optimizing transformations are performed independently of the database optimizer; for instance in the implementation of a query engine that operates over several databases.

An example application to optimization is given by the known magic rewriting transformation. Size information may be used in magic rewriting to find a suitable order of evaluation, and to select the set of parts of a query that are relevant to the evaluation of each subquery.

There are certain optimizations that ought to be performed in a system-independent manner, in particular the so-called 'magic sets transformation', which specializes a query to the context in which it is used. Previous attempts to implement that transformation were either highly specific to one database system, or applying the magic sets transformation could worsen the efficiency of a query. The various embodiments of the present invention, unlike conventional system, accurately predict the sizes of results of queries, and build an optimizer that uses such size information to optimize queries. The various embodiments of the present invention can implement the magic sets transformation in a system-independent yet effective manner so that it always improves performance.

The foregoing and other features and advantages of the present invention will be apparent from the following more particular discussion of the various embodiments of the present invention, as illustrated in the accompanying drawings.

BRIEF DESCRIPTION OF THE DRAWINGS

FIGS. 16A-16I are block diagrams giving an overview of various components of one or more embodiments of the present invention and the relationships between them according to one embodiment of the present invention.

DETAILED DESCRIPTION

Figure 1:
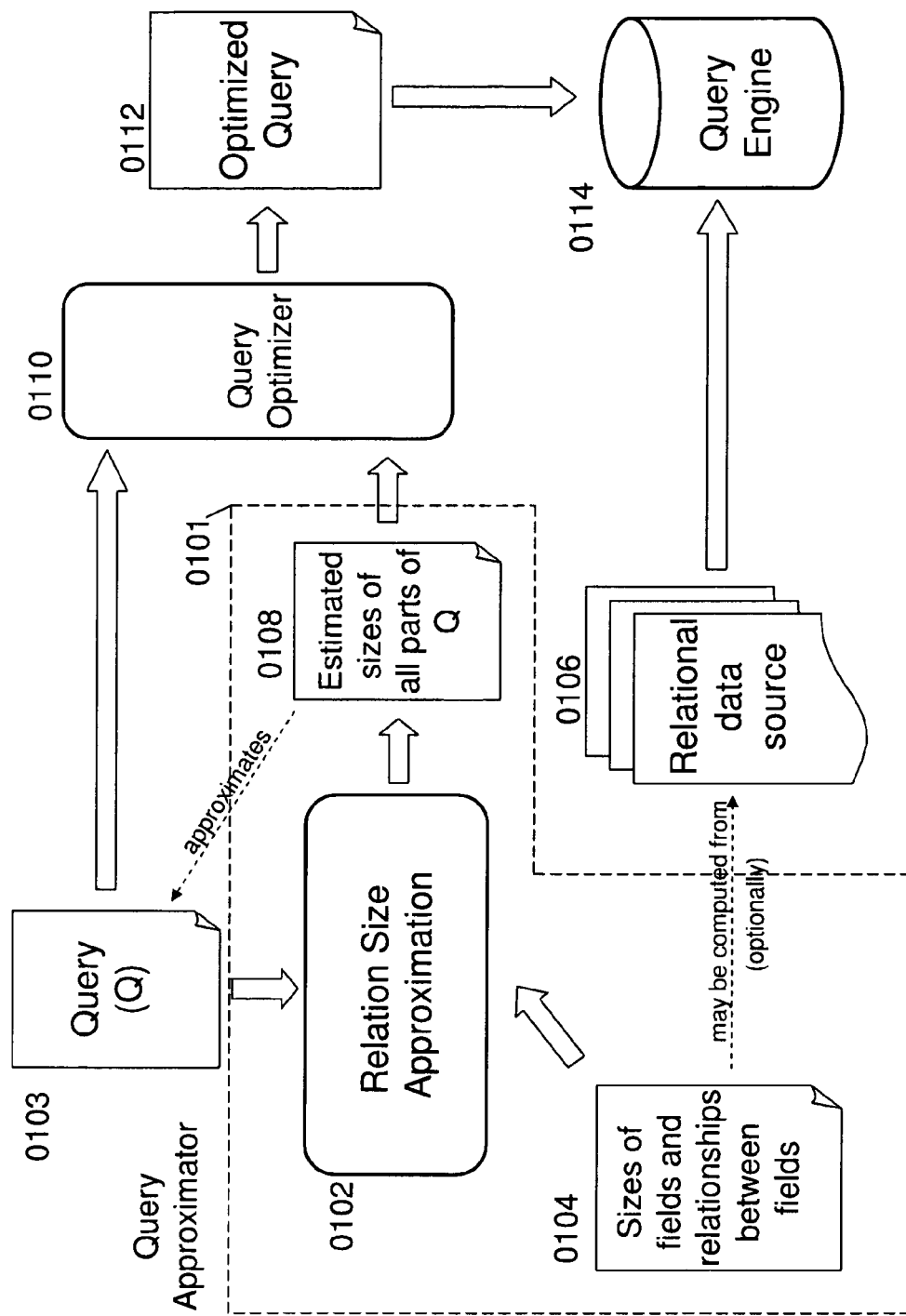
FIG. 1 is a diagram of the overall architecture of a system according to one embodiment of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

DEFINITIONS

A record gives associations between fields and values of these fields. A relation is a set of records, all of which have the same fields. These are called the fields of the relation.

The size of a field A in a relation R is the number of distinct values of the field A in records stored in R.

A relational data source is any entity that provides relational data (that is a collection of relations); a data source can for example be a relational database, but it could also be, for example, a web service or a file on a hard disk. A query over a relational data source is a means of computing one or more new relations from the relations in the data source. A query may comprise several procedures, in which case all procedures but the main procedures are called subqueries.

A database schema is an entity that describes the fields of the relations in a relational data source, but not the actual records in a relation. The database schema may include information associated with relations and fields, for instance fields may be annotated as keys, where a field is a key if the value of that field determines the values of all other fields in a record comprising that field. If a database schema is authored by a person, this person is discussed as a database designer.

Relational algebra is a means of describing queries over relational data sources using operators, including but not necessarily limited to: union, intersection, negation, projection, Cartesian product, and selection.

A graph is an entity comprising of a collection of vertices, together with a collection of edges, where each edge links one vertex (its source) to another (its target); in addition each edge may have a label. If A and B are fields of a relation R, the graph with edge relation given by A and B is the graph with: a vertex for each value of A or B in R, and an edge from a node x to a node y if R comprises a record with value x for A and value y for B.

A path in a graph is an ordered series of edges such that the target of any edge is the source of the following edge. The length of a path is the number of edges it comprises.

Magic rewriting, also referred to as the magic sets transformation in conventional systems, is an optimizing transformation of database queries, which operates by intersecting a subquery with a set of query parts (known as the magic set of the subquery) in such a way as not to change the effect of the subquery in the places in which it is used.

An inlining transformation is a transformation of queries comprising subqueries in which a use of a subquery is replaced by the body of this subquery.

Operating Environment

Efficient evaluation of queries over a relational data source is of great importance, and conventional systems comprise many optimizations of relational queries. In order for such optimizations to be effective, it is necessary to obtain estimates of the cost of evaluating a query, without incurring the cost of evaluation.

The various embodiments of the present invention approximate the number of results of a query as an estimate of its cost, to guide optimizing transformations of queries. One example of a system 0100 for approximating the number of results of a query and for performing other embodiments of the present invention is illustrated in FIG. 1. In particular, the system 0100 of FIG. 1 includes a query approximator 0101 that approximates relation sizes 0102. The relations size approximation component 0102 receives a query 0103 together with a relational data source 0106 and some additional information 0104, which may optionally be computed from the data source 0106. This query approximator 0101 produces estimated sizes 0108 for all parts of the query 0103. This information 0108 is then used by a query optimizer 0110 to transform the query 0103 to an optimized query 0112, which can be evaluated on a query engine 0114.

General Overview

Example operational hierarchies of at least some of the embodiments of the present invention are shown in FIGS. 16A-16I. In particular, FIGS. 16A-16I illustrate, in more detail, components of the various embodiments of the present invention and the relationships between these components. The concepts introduced in FIGS. 16A-16I are further explained and illustrated below.

Figure 16A:
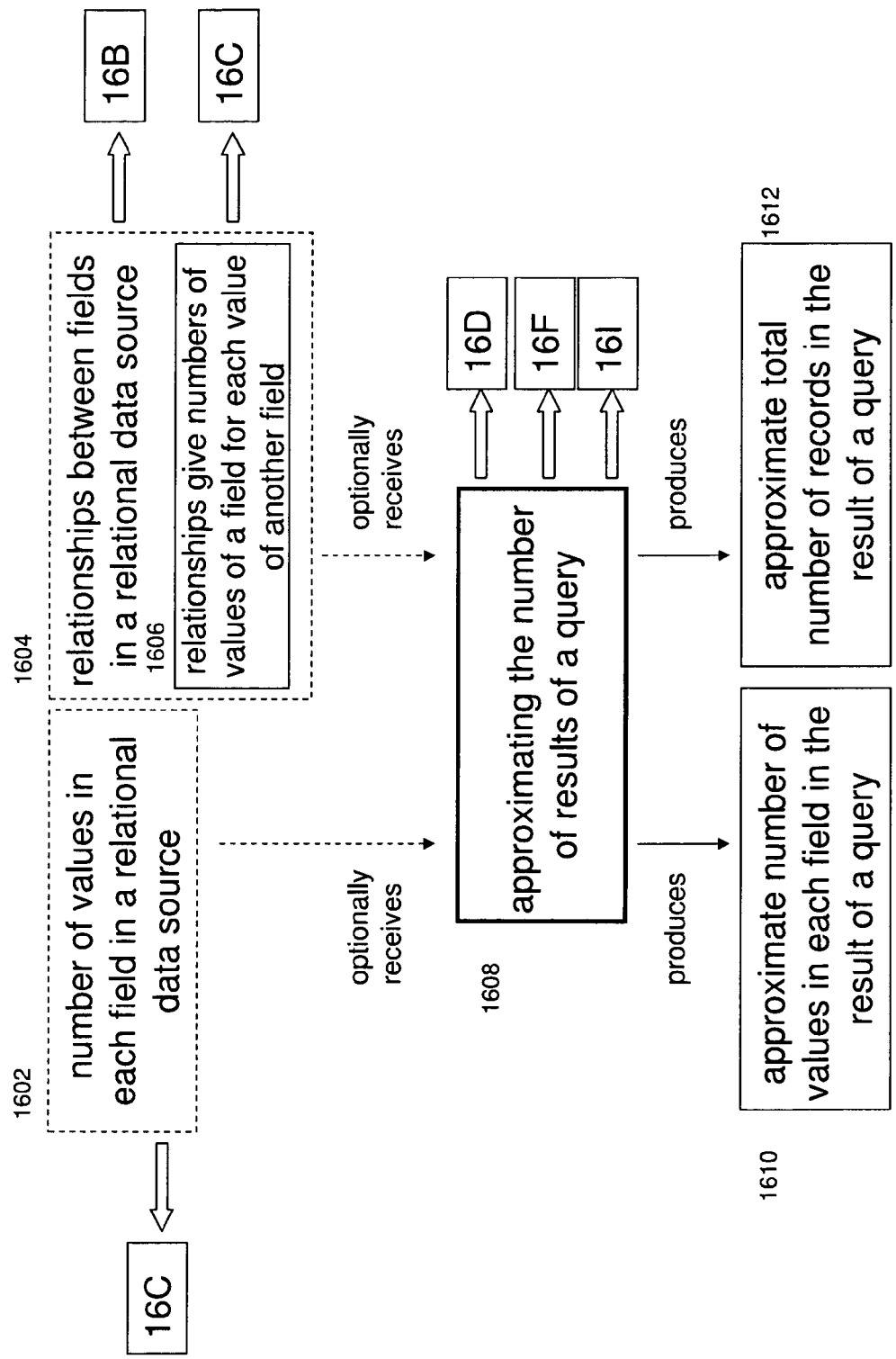
Figure 16B:
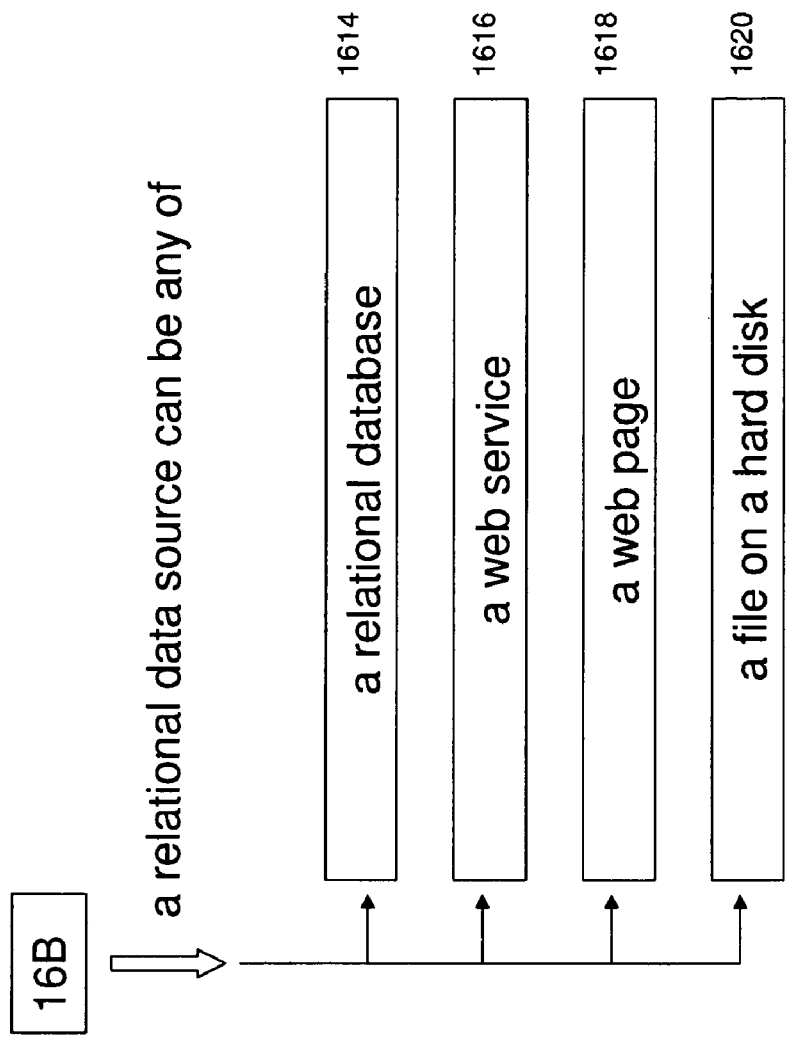

On advantage of the various embodiments of the present invention is that a query approximator 0101 approximates the number of distinct results returned by a query 1608 without having to run the query. The query 1608 is interpreted over a particular relational data source 0106, which can be any of several sources, for instance a relational database 1614, a web service 1616, a web page 1618 or a file on a hard disk 1618, as shown in FIG. 16B.

The query approximator 0101 takes as optional inputs precise or estimated values for the number of distinct values (size approximations) of fields of relations in the data source, as shown in block 1602, and relationships (relationship approximations) between fields of relations in the data source, as shown in block 1604, where a relationship between fields is the number of distinct values of a first field for each value of a second field, as shown in block 1606. The query approximator 0101 produces information useful for evaluating and optimizing queries, namely estimated numbers (query size) of values in fields of results of a query, as shown in block 1610, and estimated numbers (query quantity) of record in results of a query, as shown in block 1612.

Figure 16C:
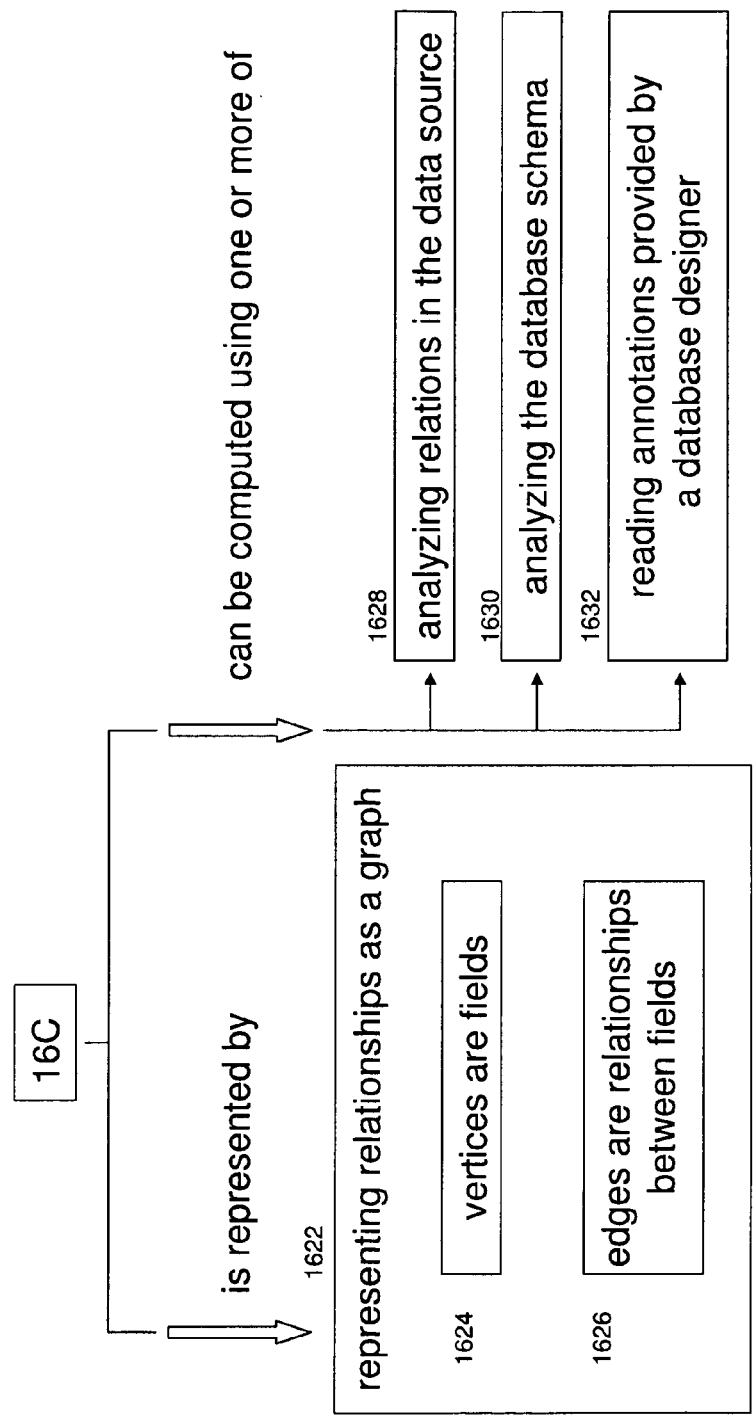

FIG. 16C shows the input to the query approximator 0101 in more detail. Its inputs 1602 and 1604 may be represented as graphs, as shown in block 1622. The vertices of the graph represent fields of relations, as shown in block 1624, and the edges of the graphs denote relationships between fields, as shown in block 1626. These inputs 1602 and 1604 may be computed using any of a variety of methods, in particular analyzing relations in the data source, analyzing the database schema and using annotations provided by a designer of a database, as shown in blocks 1628, 1630, and 1632, respectively.

Figure 16D:
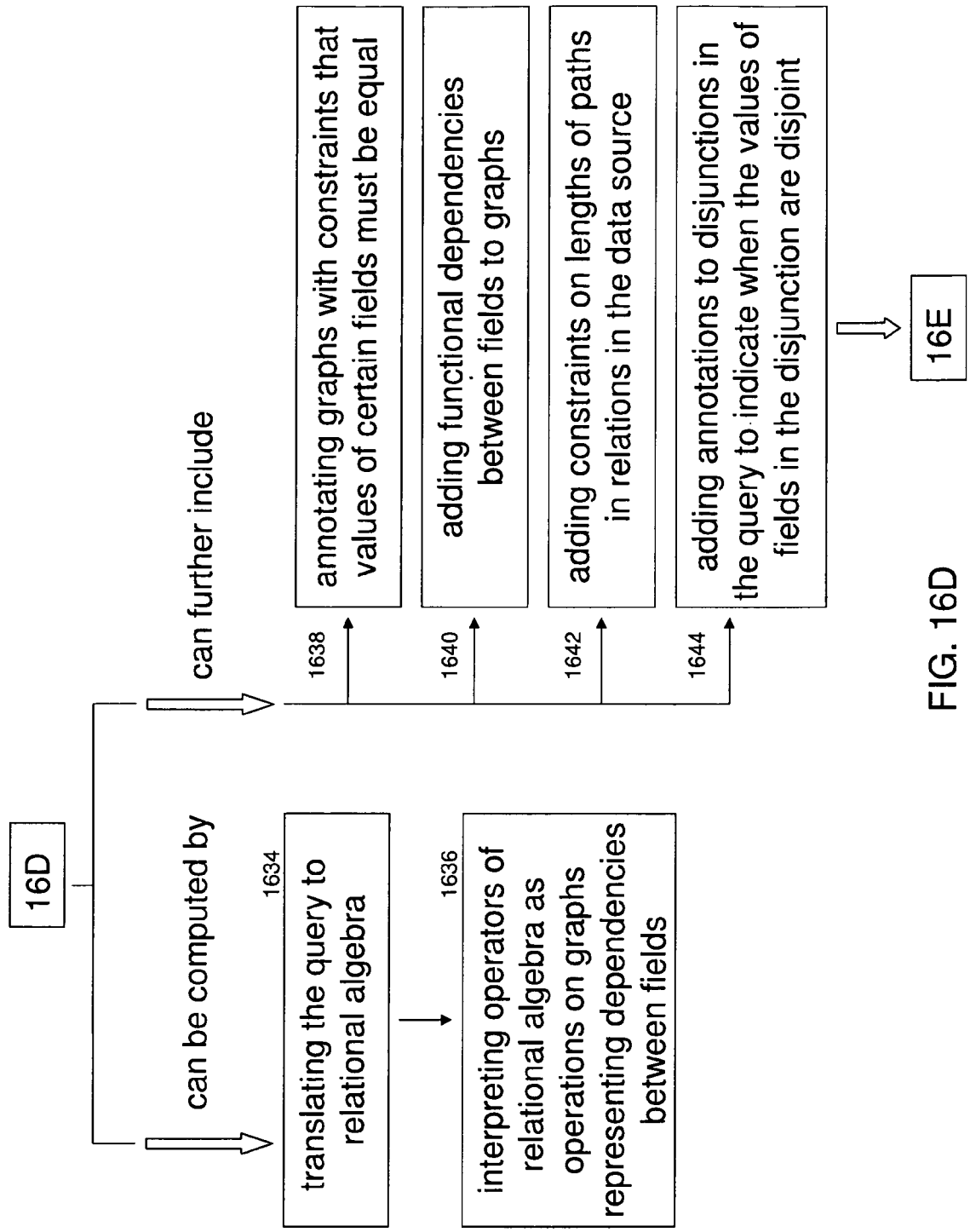
Figure 16E:
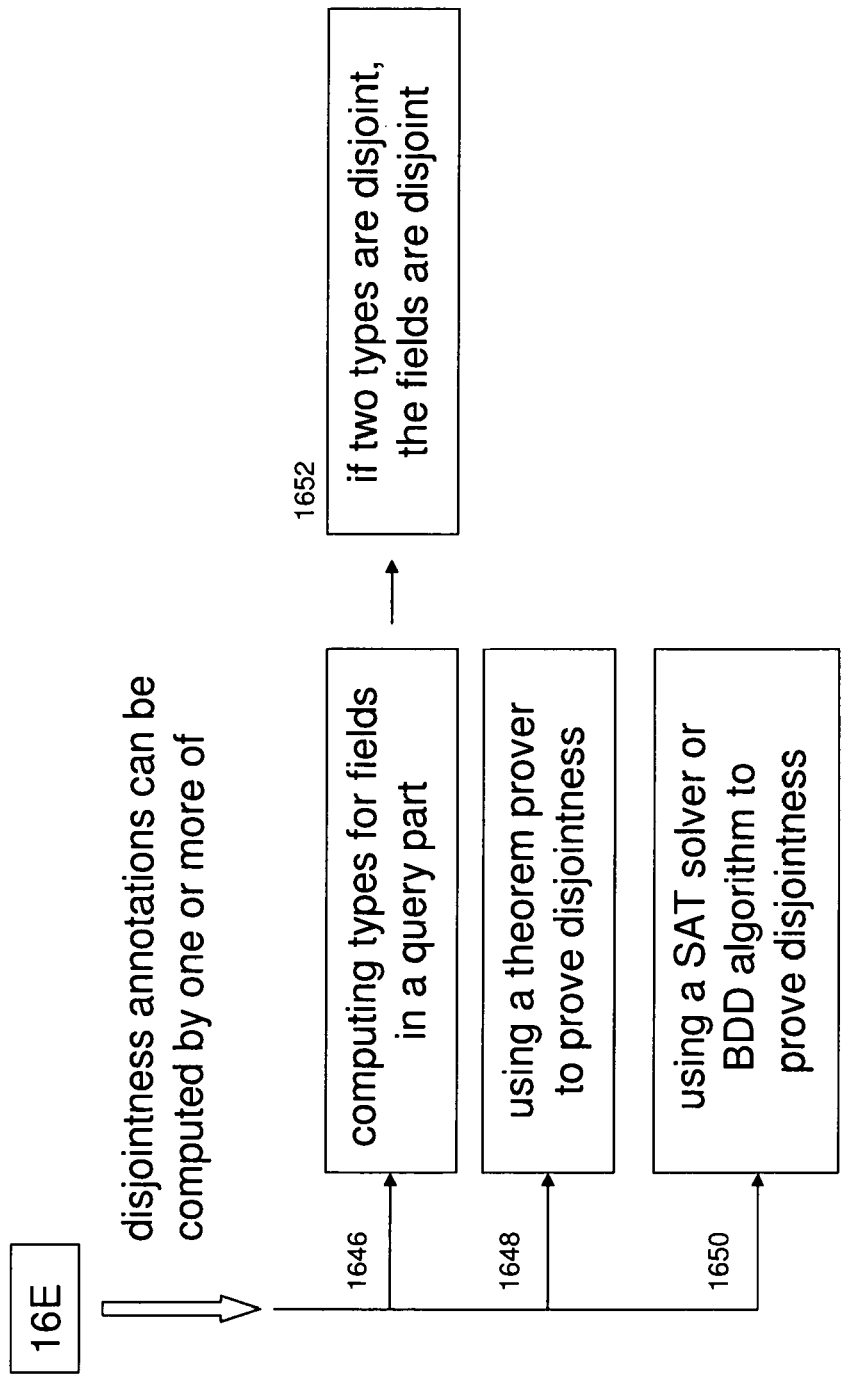

FIG. 16D illustrates some further details of the procedure for computing approximate numbers of results by the query approximator 0101. The approximation may be achieved by translating the query to relational algebra, as shown in block 1634, and using an interpretation of the operators of relational algebra different from the standard interpretation. In this alternative interpretation, the results of operations of relational algebra are graphs representing dependencies between fields, as shown in block 1636, in the same way as graphs were used in the input to the procedure, as shown in block 1626. In addition, this procedure can be refined in a number of ways such as by: adding constraints that fields of a relation must be equal, as shown in block 1638; adding a representation of functional dependencies, as shown in block 1640; adding constraints limiting the lengths of paths in relations in the data source, as shown in block 1642; and adding annotations to the program to indicate that in a disjunction, the values of a field on both sides of the disjunction are disjoint, as shown in block 1644. These disjointness annotations can be computed by a number of means independent of this invention including computing types for parts of a query, as shown in block 1646; using disjointness of types to prove disjointness of fields, as shown in block 1652; using a theorem prover to prove disjointness, as shown in block 1648; and using a SAT (generally referred to as Boolean Satisfiability) solver or an algorithm based on binary decision diagrams to prove disjointness, as shown in block 1650.

Figure 16F:
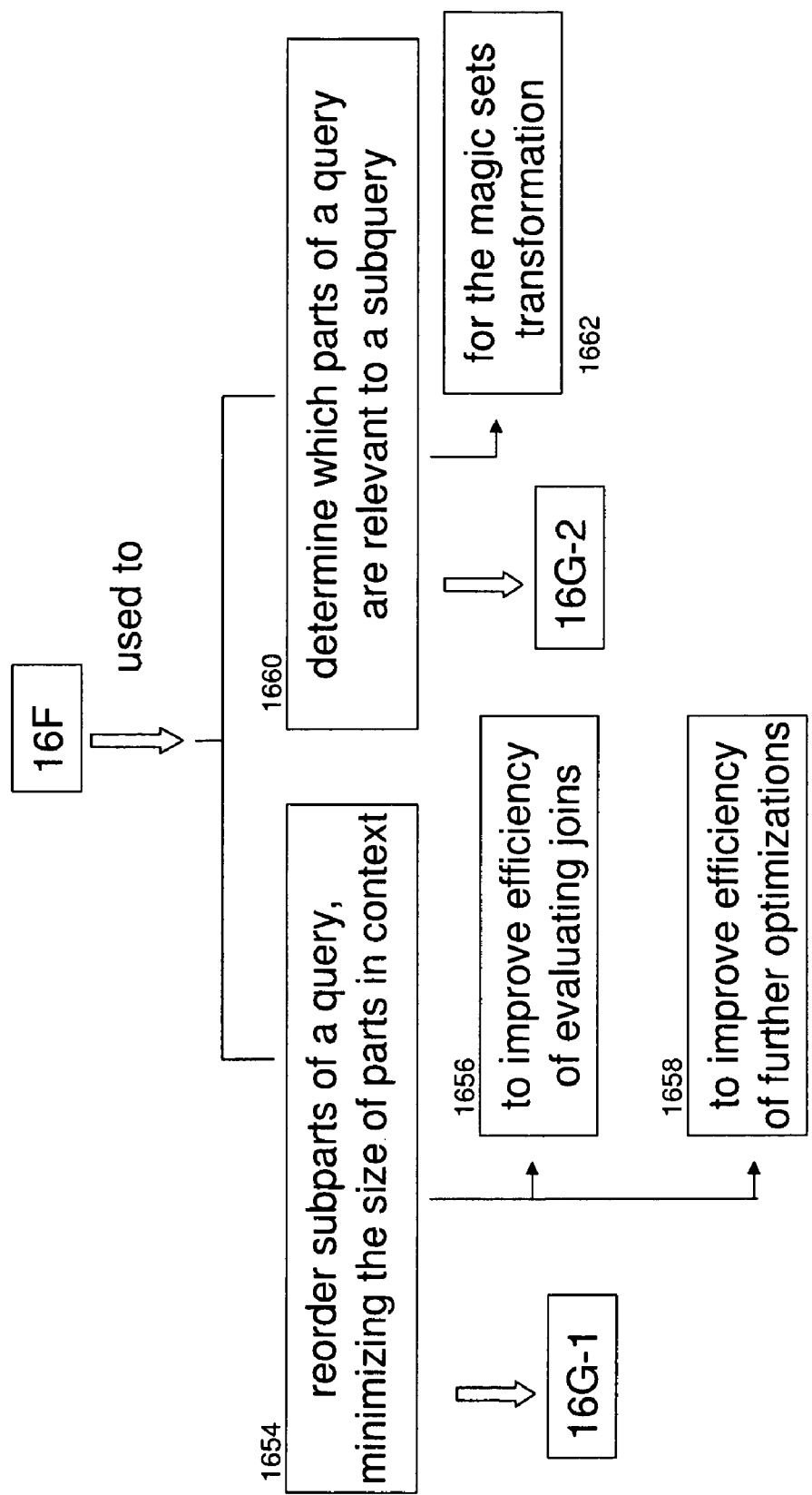
Figure 16I:
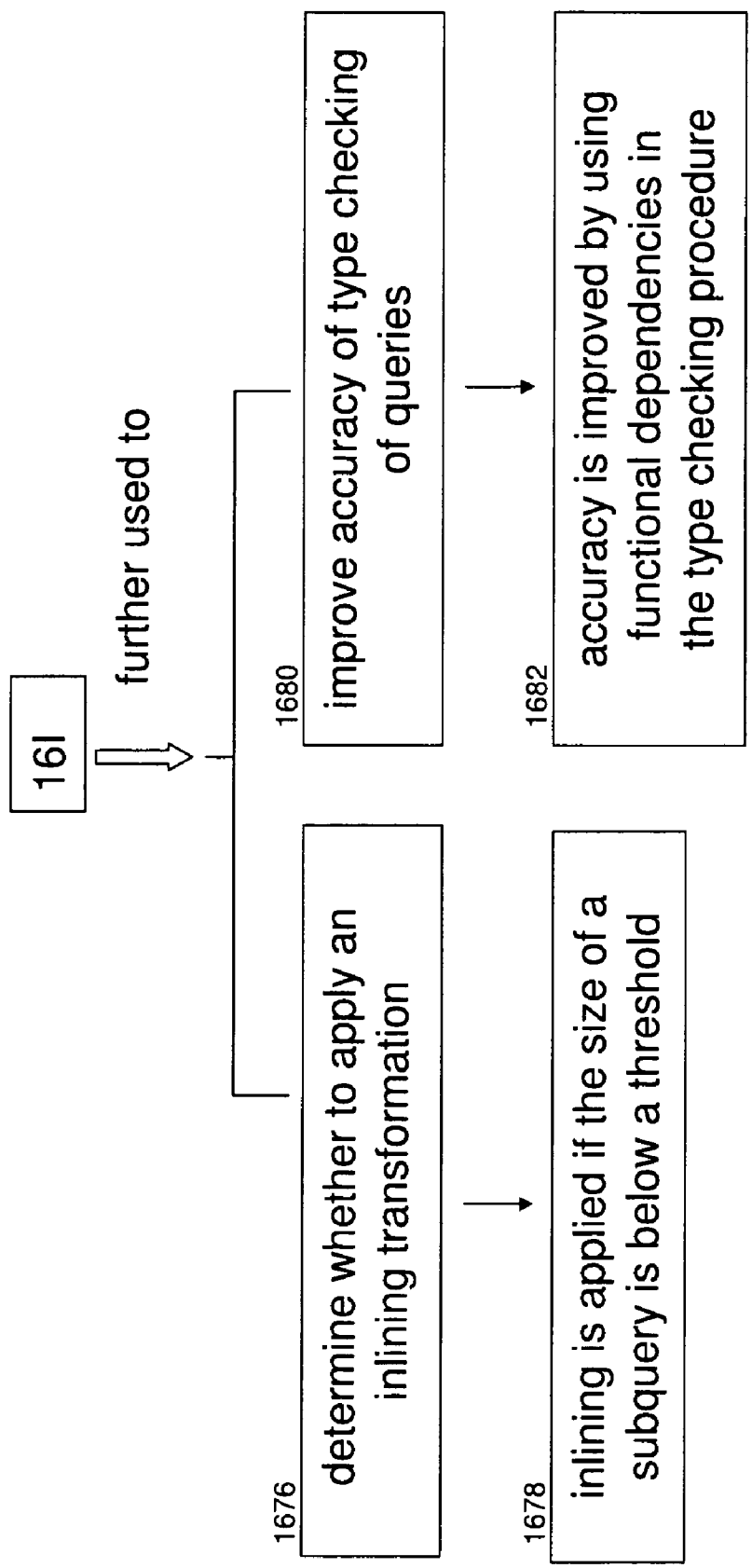

FIG. 16F illustrates non-limiting uses of the procedure for approximating results of a query that are discussed in throughout the various embodiments of the present invention. One non-limiting use of one or more embodiments of the present invention is to reorder subparts of a query, as shown in block 1654, which may be used for at least one of: improving efficiency of joins when evaluating the query, as shown in block 1656; and improving efficiency of further optimizations. A further non-limiting use of one or more embodiments of the present invention is to determine which parts of a query are relevant to a subquery, as shown in block 1660, in particular in order to apply the magic sets transformation, as shown in block 1662.

FIGS. 16G and 16H discuss the uses illustrated in FIG. 16F in further detail. One example of a procedure for reordering parts of a query is as follows: the procedure keeps an approximation of the context in which is a query part is used, as shown in block 1664, and uses this context to compute approximate numbers of results of a query part given the context in which this part appears, as shown in block 1666. Query parts are then ordered by repeatedly using the estimated number of results in a query part to select a next query part to include in the result, as shown in block 1668. One example, as shown in FIG. 16H, of a procedure for determining which parts of a query are relevant to a subquery is as follows: the procedure considers all parts of a query that appear before a use of a subquery, as shown in block 1670, and computes for each of these an approximate size of the subquery when conjoined with this query part, as shown in block 1672. A query part can be considered relevant if the estimated of the subquery conjoined with the query part is less than the estimated size of the subquery, as shown in block 1674.

FIG. 16H illustrates two additional uses of one or more embodiments of the present invention. One or more embodiments of the present invention can be used to guide an inlining transformation, as shown in block 1676, where the approximate size of a subquery is used to determine whether to inline this subquery, in particular by inlining a subquery if its size is less than a particular threshold, as shown in block 1678. A further use of one or more embodiments of the present invention is to improve accuracy of a method for typechecking queries, as shown in block 1680. Here accuracy of typechecking may be improved by using functional dependencies, as shown in block 1682, as optionally computed by the various embodiments of the present invention herein, as shown in block 1640.

Estimating the Sizes of Relations

Throughout the discussion of the various embodiments of the present invention, it should be noted that the semantics of queries are interpreted as sets, not multisets, of records, so that the size of a relation is the number of distinct records it comprises, and the size of a field of a relation is the number of distinct values of that field. This does not prohibit the various embodiment of the present invention from being used in a context where queries are interpreted as producing multisets.

The query approximator 0101 records a dependency graph for each relation that is either present in the relational data source or computed by a query. Dependency graphs are intended to encode all the known information about the size of each field of a relation, as well as known dependencies between distinct fields of a relation.

Figure 2:
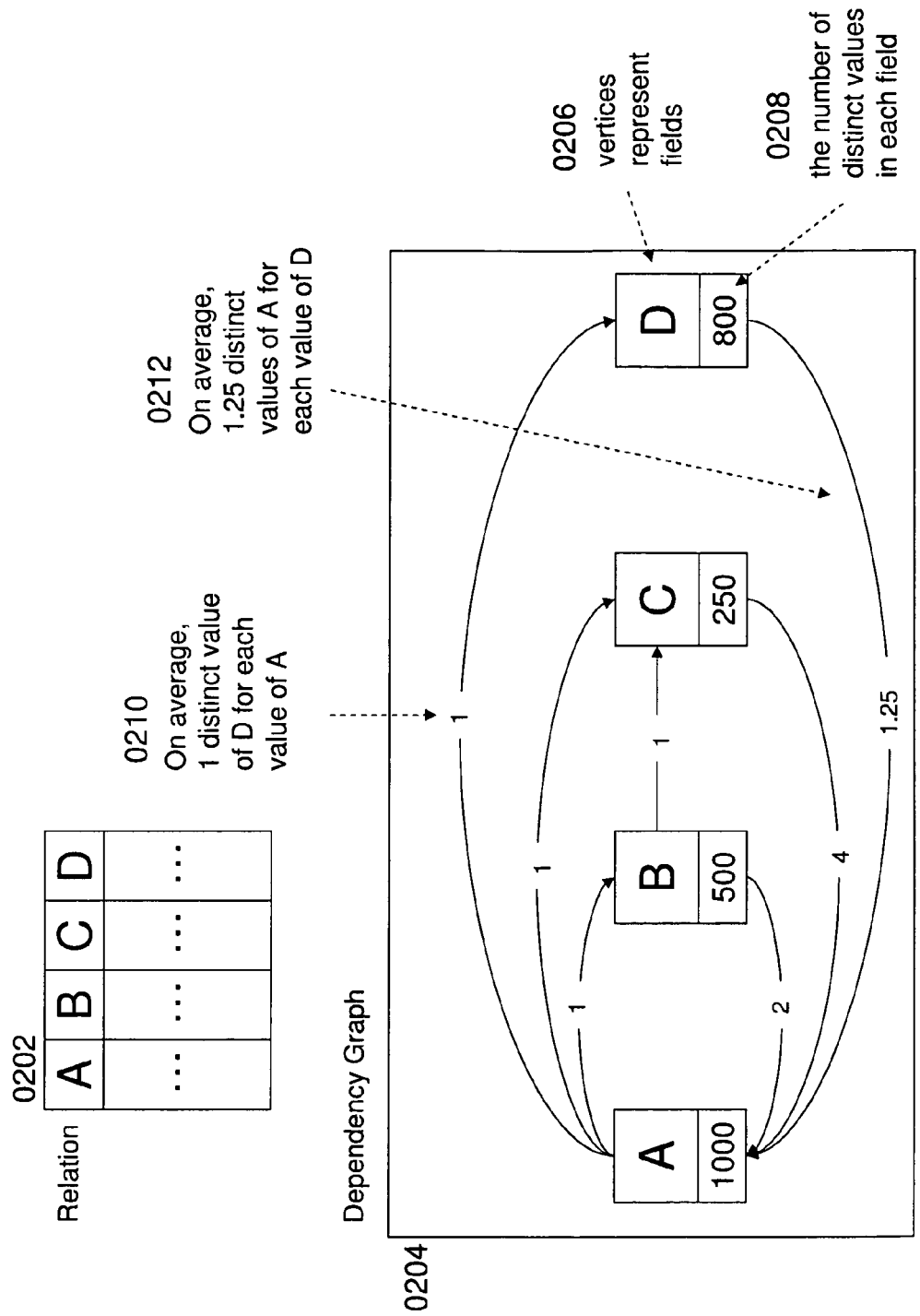
FIG. 2 is a representation of a dependency graph, which records dependencies between fields to estimate the number of results of a query, according to one embodiment of the present invention.

A dependency graph is discussed in FIG. 2. A dependency graph for a relation R comprises a vertex for each field of R. Each such vertex, say for a field F, is annotated with an estimate of the size of F. In the example dependency graph 0204 depicted in FIG. 2, the relation has four fields A, B, C and D 0202, so the graph comprises four nodes A, B, C and D 0206. Each node is annotated with the estimated size of the corresponding field 0208.

In addition, a dependency graph comprises any number of edges between vertices. Each edge is labeled with a real number, which should be at least 1. The intended meaning of an edge from A to B labeled x is: for each distinct value a of A, there are, on average, x distinct values of B. More precisely, the intended meaning is:

--- x = average { bNumber(a) | a is a value of A }
where
bNumber(a) = size ( project(select(R, A = a), b) )

---

In the above, the notation select(R, A=a) denotes the relation comprising all records of R with value a for field A, while project(S, b) denotes the projection of a relation S on a field b. In both cases these are intended as sets, not multisets.

In the example graph depicted in FIG. 2, the edge from A to D 0210 indicates that there is, on average, one value of D for each value of A; while the edge from D to A indicates that there are, on average, 1.25 distinct values of A for each value of D. In addition, a dependency graph may include a collection of equality constraints, of the form A=B, where A and B are fields appearing in the dependency graph. Equality constraints are illustrated in the top portion 0302 of FIG. 3. The intended meaning of an equality constraint A=B is that a dependency graph with this constraint describes relations in which all records hold equal values for fields A and B.

A dependency graph is written as a quadruple (V, E, S, Eq), where: V is a set of vertices, E is a set of edges each of the form (A, x, B) for some vertices A and B and some number x, S is a function from E to positive numbers (or $\infty$) giving the size annotation of each vertex, and Eq is a set of equality constraints of the form A=B, where A and B are vertices. The dependency graph of FIG. 2 is therefore written as (V, E, S, Eq) where: V={A, B, C, D}; E={(A,1,B), (A,1,C), (A,1,D), (B,2,A), (C,4,A), (D,1.25,A)}; S(A)=1000, S(B)=500, S(C)=250, S(D)=800; and Eq={ }.

A dependency graph may comprise one edge from any vertex A to another vertex B; when there is a choice then edges with lower labels are preferred in one embodiment. Accordingly, in the remainder of this discussion "adding an edge (A, x, B) to a graph" refers to the following procedure: if the graph comprises no edge from A to B, the edge should be added; otherwise, if the graph comprises an edge (A, y, B) then this edge should be removed, and the edge (A, min(x,y), B) added.

Dependency graphs are first generated for relations stored in the data source. They are then computed for each part of the query. Both of these procedures are discussed below.

Dependency Graphs for Relations in the Data Source

Each relation in the data source 0106 is expected to be given a dependency graph, so that dependency graphs for queries may be computed. These dependency graphs may be obtained by one or more of: analyzing the data in the relation; and using hand-written annotations. In this section, a possible construction of a dependency graph for a relation R using a combination of analysis and annotation is discussed. Any part of this construction is optional; however the more information is added to the graph, the more precise the resulting analysis will be.

The relation in the data source is first analyzed to compute the size of each field in the relation. If R has fields $A_1, \ldots, A_n$ this may be achieved by any means equivalent to the following SQL query:

---

SELECT COUNT(DISTINCT $A_1$), ..., COUNT(DISTINCT $A_n$)
FROM R

---

The $i^{th}$ column of the result of the above query is the size of $A_i$, written $S_i$. The dependency graph has n fields $A_1, \ldots, A_n$. The $i^{th}$ field $A_i$ is labeled with size $S_i$. Edges are now added to the dependency graph using the database schema. For any field $A_i$ of R that the schema specifies is a key for R, all edges of the form ($A_i$, 1, $A_j$) for j≠i are added to the graph. Furthermore, for each j≠i, the edge ($A_j$, x, $A_i$), where x=$S_i$/$S_j$, is added to the graph.

Edges are now added to the dependency graph using annotations written by the database designer. For any relation R in the data source and fields A and B of R; the database designer may add an annotation of the form R: (A, x, B) to indicate a dependency between fields A and B of R. For each such annotation, the edge (A, x, B) is added to the graph. For each pair of edges (A, x, B) and (B, y, C) in the graph, the edge (A, xy, C) is added to the graph. This process is iterated until the graph stops changing. The graph is mathematically guaranteed to stop changing after a finite number of iterations. The graph for R has no equality constraints.

Operations on Dependency Graphs

As a prerequisite to computing dependency graphs for queries, several essential operations on dependency graphs are now discussed. Throughout these definitions, arithmetic operations are extended to handle $\infty$ in a standard fashion. In particular, $\infty+x=x+\infty=\infty$; $\infty*x=x*\infty=\infty$; min(x, $\infty$)=min($\infty$, x)=x and max(x, $\infty$)=max($\infty$, x)=$\infty$.

The normalization of a graph G=(V, E, S, Eq) is the graph G'=(V, E', S', Eq') computed by the following procedure. First, set Eq'=Eq and add all constraints of the form A=A, where A is in V. Next, repeatedly apply the following. For each pair of constraints A=B and B=C in Eq', add the constraint A=C to Eq', and for each constraint A=B in Eq' add the constraint B=A to Eq'. This procedure is repeated until Eq' stops changing. Next, for each vertex A in V, set S'(A) to the minimum of S(B) for all B such that Eq' comprises a constraint A=B. Next, for each edge (A, x, B) in E, and each pair of vertices A' and B' such that Eq' comprises constraints of the form A=A' and B=B', add the edge (A', x, B') to E'. Finally, for each pair of edges (A, x, B) and (B, y, C) in E', add the edge (A, xy, C) to E'. This step is repeated until E' stops changing.

Figure 3:
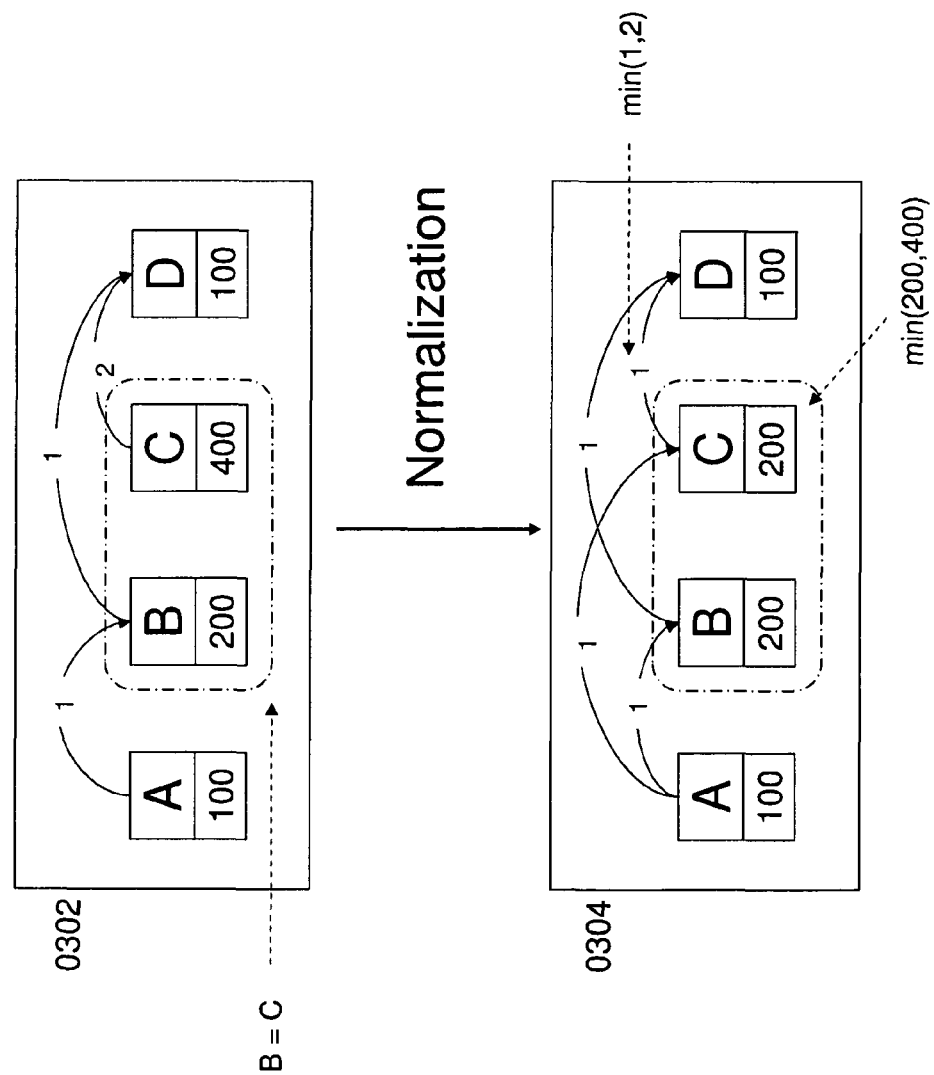
FIG. 3 is a diagram of a dependency graph with added information regarding equalities between fields according to one embodiment of the present invention.

The normalization operation is illustrated in FIG. 3, which depicts a dependency graph 0302 and the result 0304 of applying the normalization operation to the graph 0302. Normalization does not change the meaning of the graph, and is used just to make information implied by a dependency graph explicit. A graph is said to be normalized if the normalization operation has been applied to it. All graphs produced by operations discussed below may not be normalized, and normalization should always be applied after these operations to restore this property.

Figure 4:
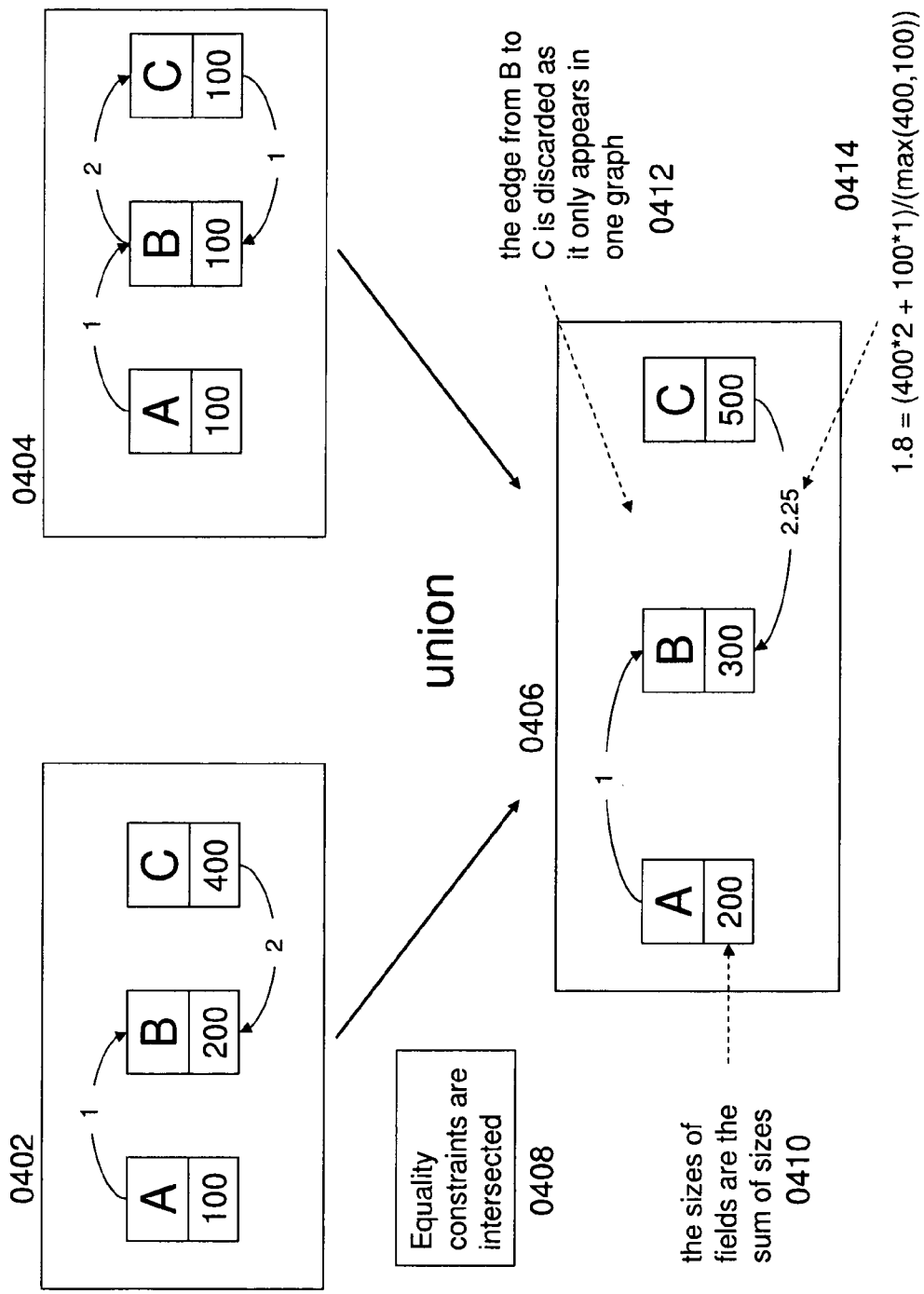
FIG. 4 is a diagram illustrating how a dependency graph for a union of two relations may be computed from dependency graphs for the relations according to one embodiment of the present invention.

In the description of the following operations, two dependency graphs $G_1=(V_1, E_1, S_1, Eq_1)$ and $G_2=(V_2, E_2, S_2, Eq_2)$ are fixed. It is assumed that these graphs are normalized. If it is desired to apply these operations to graphs that are not normalized, then the normalization operation should be applied first. The union graph of $G_1$ and $G_2$ may be computed provided $V_1=V_2$. This is the graph $G=(V, E, S, Eq)$ illustrated in FIG. 4. The set of vertices is $V=V_1=V_2$. The set E of edges is defined by: for any pair of fields A and B such that $E_1$ comprises an edge (A, x, B) and $E_2$ comprises an edge (A, y, B), E comprises an edge (A, z, B) where $z=(x*S_1(A)+y*S_2(A))/(\max(S_1(A), S_2(A)))$. The function S is defined by: $S(A)=S_1(A)+S_2(A)$ for each A. Finally, $Eq=Eq_1 \cap Eq_2$. In FIG. 4 a union of two graphs 0402 and 0404 is depicted, resulting in graph 0406. For example, the size of A in the result is 200, the sum of the sizes of A in the two source graphs 0410, while equality constraints are intersected, as shown in block 0408. The computation of an edge in the union is illustrated in block 0414.

Figure 5:
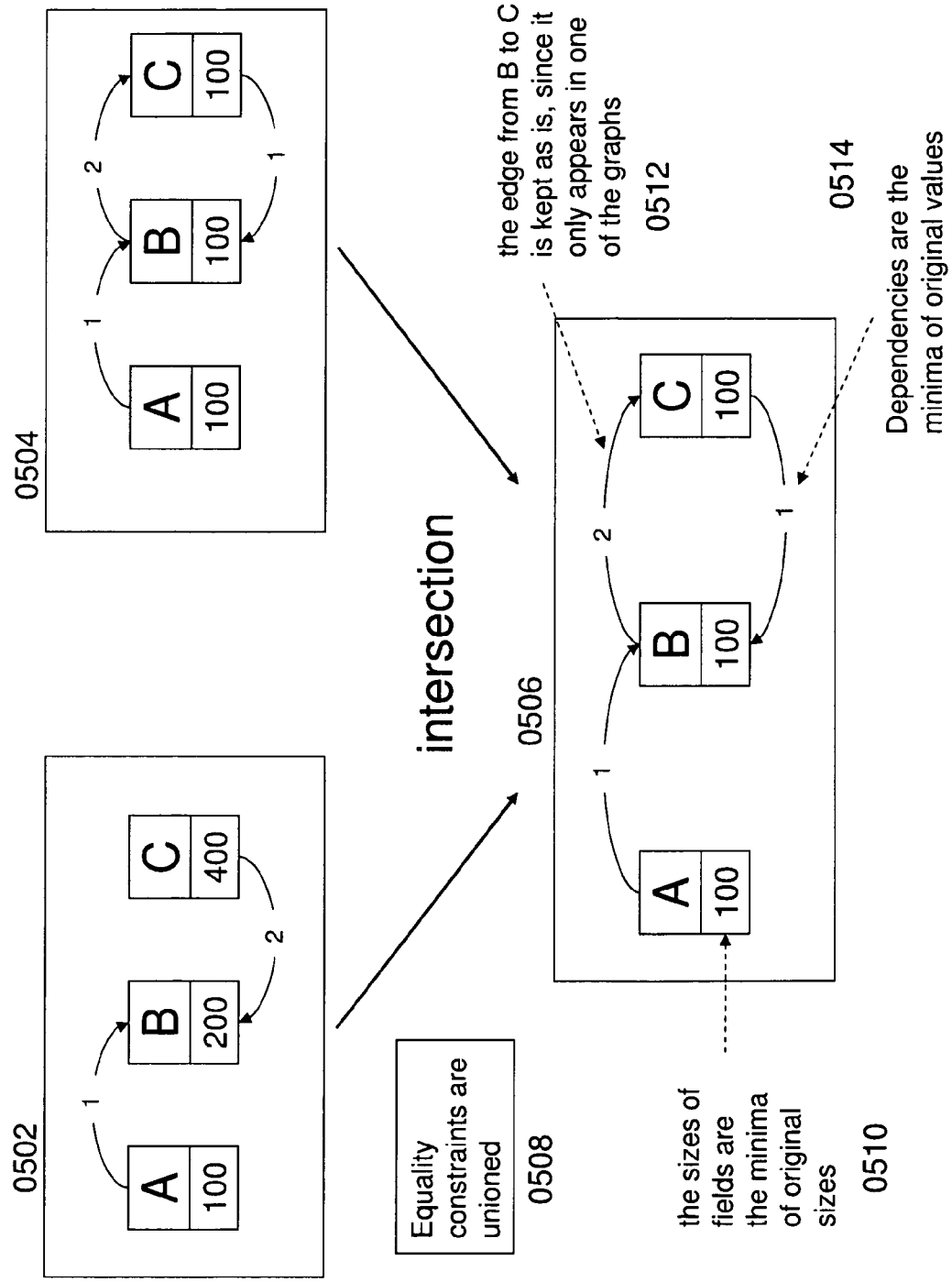
FIG. 5 is a diagram illustrating how a dependency graph for an intersection of two relations may be computed from dependency graphs for the relations according to one embodiment of the present invention.

The intersection graph of $G_1$ and $G_2$ may be computed provided $V_1=V_2$. This is the graph $G=(V, E, S, Eq)$ illustrated in FIG. 5. The set of vertices is $V=V_1=V_2$. The set E of edges is obtained by adding all edges in $E_2$ to the set of edges in $E_1$. The function S is defined by: $S(A)=\min(S_1(A), S_2(A))$ for each A. Finally, $Eq=Eq_1 \cup Eq_2$. In FIG. 5, an intersection of two graphs 0502 and 0504 is depicted, resulting in graph 0506. For example, the size of A in the result is 100, which is the minimum of the sizes of A in the two source graphs (0510). Furthermore, the resulting graph has the union of the equality constraints in the source graphs 0508. Finally, 0512 and 0514 illustrate the computation of the edges of the intersection graph.

Figure 6:
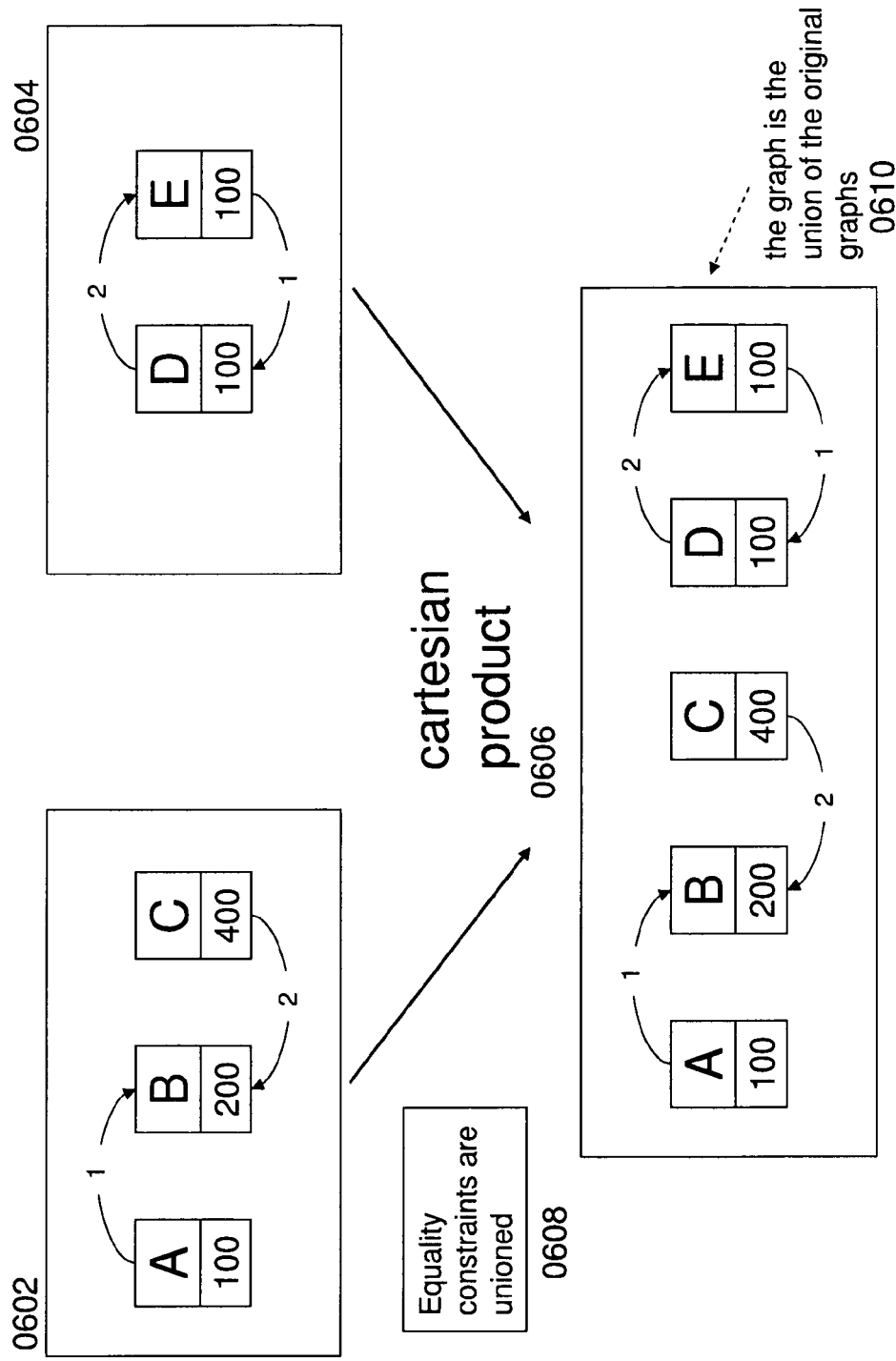
FIG. 6 is a diagram illustrating how a dependency graph for a product of two relations may be computed from dependency graphs for the relations according to one embodiment of the present invention.

The Cartesian product graph of $G_1$ and $G_2$ may be computed provided $V_1 \cap V_2 = \emptyset$. This is the graph $G=(V, E, S, Eq)$ illustrated in FIG. 6. The set of vertices is $V=V_1 \cup V_2$. The set of edges is $E=E_1 \cup E_2$. The size function S is defined by $S(A)=S_1(A)$ if $A \in V_1$, and $S(A)=S_2(A)$ if $A \in V_2$. Finally, $Eq=Eq_1 \cup Eq_2$. In FIG. 6 the Cartesian product graph 0606 of two graphs 0602 and 0604 is illustrated. This graph is just the union of the two source graphs 0610.

In the discussion of the remaining operations below, a graph $G=(V, E, S, Eq)$ is fixed. G is assumed to be normalized. The projection of G on a subset X of V is the graph $G'=(X, E', S', Eq')$ defined as follows. The set E' comprises all vertices (A, x, B) in E such that $A \in X$ and $B \in X$. The function S' is defined by $S'(A)=S(A)$ whenever $A \in X$. Finally, Eq' comprises all equality constraints A=B in Eq such that $A \in X$ and $B \in X$.

Figure 7:
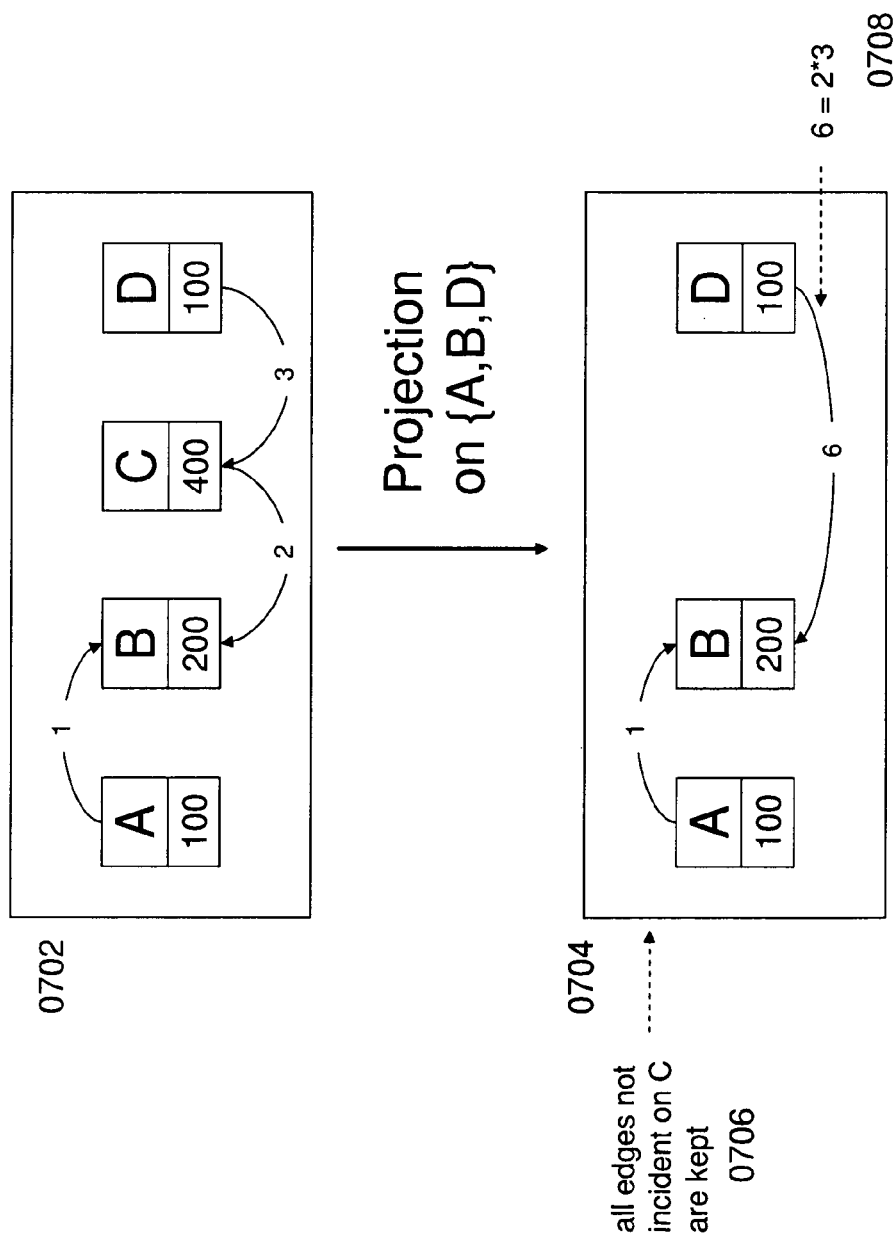
FIG. 7 is a diagram illustrating how the dependency graph for a projection of a relation on some of its fields may be computed from a dependency graph for the relation according to one embodiment of the present invention.
Figure 8:
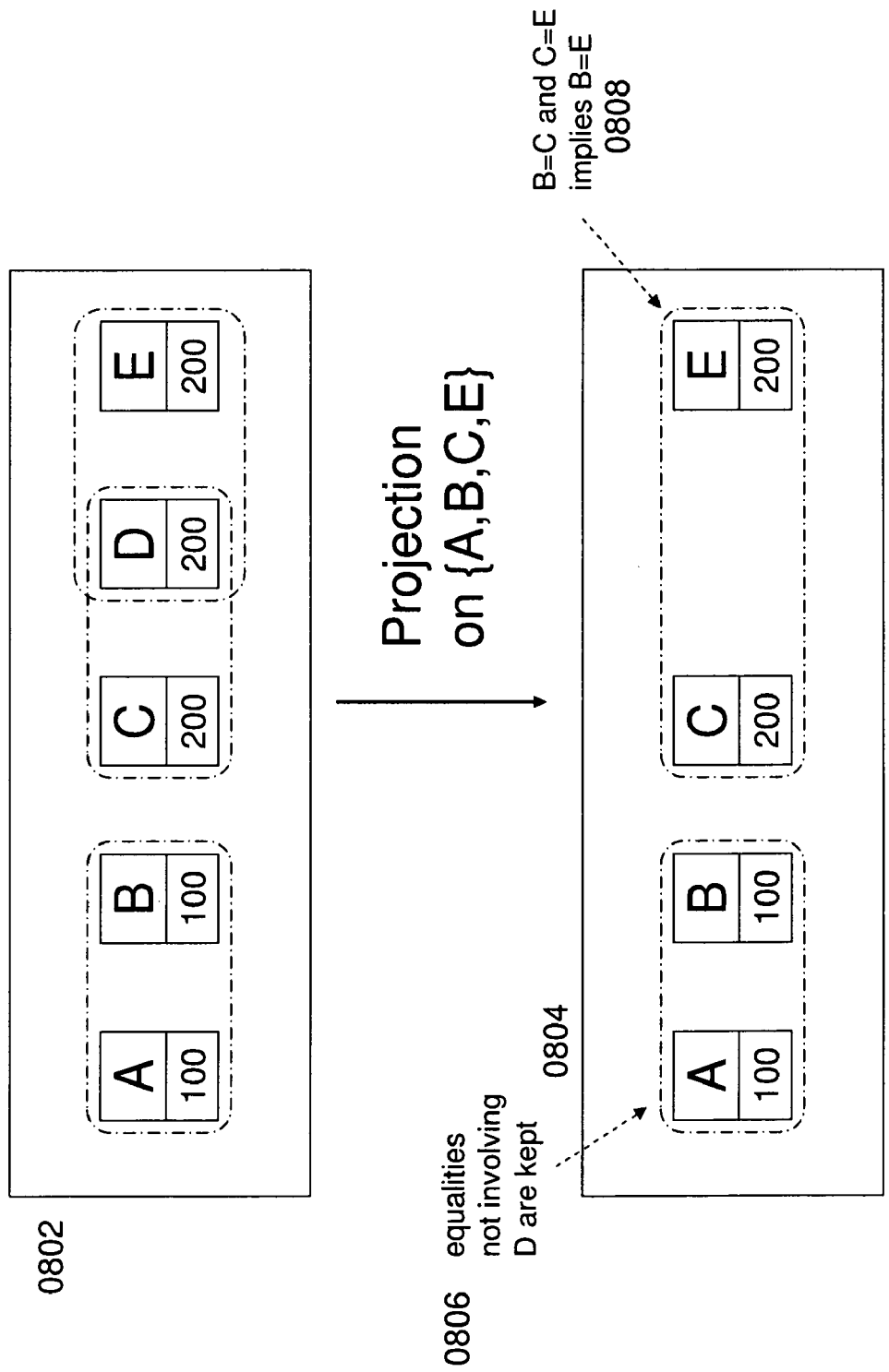
FIG. 8 is a diagram showing equalities between fields in the projection of a relation on some of its fields according to one embodiment of the present invention.

FIG. 7 and FIG. 8 illustrate an alternative procedure for computing the projection of G on a set X of vertices (here X={A, B, D} for illustration purposes), to avoid normalization of G. This is preferable as normalization is an expensive operation. The projection is denoted by $G'=(V', E', S', Eq')$ as above, but in this case it is not assumed that G is normalized. The computation of V'=X and S' proceeds as in the previous case. To compute E', first add all edges (A, x, B) in E such that $A \in X$ and $B \in X$. Next, for each pair of edges (A, x, B) and (B, y, C) in E where $B \notin X$, add the edge (A, xy, C). This is illustrated in FIG. 7. In FIG. 7 the projection of a graph 0702 on fields {A, B, D} is shown, resulting in a graph 0704. This comprises all edges not incident on C 0706, together with new edges formed as the product of edges incident on C 0708. The set Eq' of equality constraints is computed as follows. First, add all constraints of the form A=B in E where $A \in X$ and $B \in X$. Next, for each pair of constraints A=B and B=C, where $B \notin X$, add the constraint A=C. This is illustrated in FIG. 8. In FIG. 8 the projection of a graph 0802 comprising equality constraints is shown as graph 0804. This illustrates that equalities not involving the removed field D are kept in the result 0806, while equalities implied by equalities involving the same field D are added 0808.

If $X \supset V$, the extension of G is the graph $G'=(X, E, S', Eq)$ where $S'(A)=S(A)$ whenever $A \in V$ and $S'(A)=\infty$ otherwise. The procedure of computing the graph G' from G is referred to as extending G to X. The graph obtained from G by adding the equality A=B where $A \in V$ and $B \in V$ is the graph $G'=(V, E, S, Eq \cup \{A=B\})$. The graph obtained from G by setting A to a constant, where $A \in V$, is the graph $G'=(V, E, S', Eq)$, where: $S'(C)=S(C)$ for all $C \neq A$, and $S'(A)=1$. Let f be an injective function from fields to fields. The graph obtained from G by renaming with f is the graph $G'=(V', E', S', Eq')$, where: $V'=\{f(A) | A \in V\}$; $E'=\{(f(A), x, f(B)) | (A, x, B) \in E\}$; $S'(B)=S(f^{-1}(B))$ for all B; and $Eq'=\{f(A)=f(B) | A=B \in Eq\}$. Given a set V of fields, the graph Bottom(S) is the graph (V, E, S, Eq) defined as follows. E consists of all edges of the form (A, 1, B) where $A \in V$ and $B \in V$. The function S is defined by $S(A)=1$ for all $A \in V$. Finally, Eq consists of all constraints A=B where $A \in V$ and $B \in V$. Given a set V of fields, the graph Top(S) is the graph $(V, \emptyset, S, \emptyset)$ where $S(A)=\infty$ for all A.

Computing the Dependency Graph of a Query

A procedure for computing a dependency graph for each subpart of a query is outlined below. The procedure includes first converting a query into an expression of relational algebra, in a manner known to those familiar with the art, and evaluating the resulting relational algebra expression in a non-standard way, replacing each relational algebra operator with a corresponding operator on dependency graphs. This procedure of abstract interpretation is known to one of ordinary skill in the art; one point of novelty of one or more embodiments of the present invention lies in the specific interpretation of operators.

The construction of relational algebra expressions is shown below:

| RA ::= | |
|---|---|
| false | |
| \| true | |
| \| R | (a relation R in the data source) |
| \| P ($A_1, ..., A_n$) | (a use of a defined relation P) |
| \| RA ∩ RA | |
| \| RA ∪ RA | |
| \| not(RA) | |
| \| RA × RA | |
| \| project(RA, S) | (projection on a set S of fields) |
| \| select(RA, A=B) | (selection by field equality) |
| \| select(RA, A=c) | (selection by constant equality) |

Each of the different ways of combining relational algebra expressions is referred to as a relational algebra operator. Each relational algebra expression E is further given a set Fields(E) of fields indicating the fields of the relation it denotes, which may be deduced from the context in which E appears in a standard way.

In a use $P(A_1, \ldots, A_n)$ of a defined relation P, the $A_i$ are fields. This use renames the fields of P to the $A_i$. It is a requirement that each $A_i$ should be a distinct field, so that no duplicates may appear in the list. This is nonstandard, but is intended to simplify presentation. The restriction is inessential, as the operator of selection by field equality may be used to replicate the effect of duplicate fields. Each such use defines an injective function $f(B_i)=A_i$, where the fields of P are $B_1, \ldots, B_n$, called the renaming associated with U.

The dependency graph of E=false is the graph Bottom (Fields(E)). The dependency graph of E=true is the graph Top(Fields(E)). The dependency graph of a relation R in the data source is computed in the manner outlined previously. The dependency graph of a use U of a defined relation P can be computed by renaming the dependency graph for P with the renaming associated with U. The dependency graph for an expression $R_1 \cap R_2$ is computed by first computing the graphs of $R_1$ and $R_2$, and computing the intersection graph of the resulting graphs. The resulting graph should be normalized.

The dependency graph for an expression $R_1 \cup R_2$ is computed by first computing the graphs of $R_1$ and $R_2$, and computing the union graph of the resulting graphs. The resulting graph should be normalized. The dependency graph of an expression E=not(R) is Top(Fields(E)). The dependency graph for an expression $R_1 \times R_2$ is computed by first computing the graphs of $R_1$ and $R_2$, and computing the Cartesian product graph of the resulting graphs. The dependency graph for an expression project(R, S) is computed by first computing the graph of R, and computing the projection of this graph on S. The dependency graph for an expression select(R, A=B) is computed by first computing the graph of R. The graph of select(R, A=B) is obtained from this graph by adding the equality A=B. The dependency graph for an expression select (R, A=c) is computed by first computing the graph of R, and setting A to a constant in this graph.

Computing Dependency Graphs for Programs

A procedure for computing dependency graphs of relational algebra expressions was given above. It is now extended to a procedure for computing dependency graphs for all expressions appearing in a program; this is necessary in particular for the treatment of recursive queries. A program is a collection of definitions of the form:

$P(X_1, \ldots, X_n) :- E$

Such a definition introduces a defined relation P with fields $X_1, \ldots, X_n$. The expression E of relational algebra defines the value of the relation P, and is referred to as the body of P.

A defined relation P is said to depend on a relation Q if: a reference to Q appears in the body of P; or if a reference to some relation R that depends on Q appears in the body of E. Programs are subject to the following restriction: if an expression of the form not(E) appears in the body of P, then no reference to P or any relation that depends on P can appear in E. This restriction is standard, and is known as the stratification requirement in conventional systems. The procedure discussed below is mathematically guaranteed to terminate and give correct results for stratified programs, but not for others.

In order to compute dependency graphs for all subexpressions and defined relations in the program, the strongly-connected components of the dependency relation between relations are computed. The components are then processed in an order consistent with the dependency relation, so that before a component C is processed, all components D such that some relation in C depends on some relation in D should be processed. Procedures for computing components and finding a suitable order (also known as a topological order) are known to those with ordinary skill in the art.

A component is processed, in order to compute dependency graphs for all expressions and defined relations in the component, in the following fashion: If a component comprises a single relation P that does not depend on itself, then the dependency graph of P may be computed by computing the graph of the body of P in the manner discussed above.

Otherwise, the relations in the component are evaluated simultaneously by fixpoint iteration. Suppose that the relations in the component are $P_1, \ldots, P_n$, and let $G_1, \ldots, G_n$ be the corresponding dependency graphs. Initially set each $G_i$ to the graph Bottom($S_i$), where $S_i$ is the set of fields of $P_i$. Then, evaluate the typings of the bodies of the relations in the component, using $G_i$ as the graph of $P_i$ wherever necessary (that is, for recursive uses of $P_i$). This yields graphs $G_1', \ldots, G_n'$. If $G_i=G_i'$ for each i then the $G_i$ are the graphs of the $G_i$. Otherwise, set $G_i$ to $G_i'$ for each i and repeat this procedure.

Controlling Termination

In order to guarantee termination of this procedure, it is necessary to restrict the set of dependency graphs to a finite set. A method for achieving this is outlined below; it should not be construed as the only possible way to guarantee termination.

First, set a bound MAX, which should be larger than the largest expected size of any field of a relation. This will be used as an upper bound on the size annotations of fields. Further set a bound D to be used as an upper bound on the labels of edges in dependency graphs. The value of D is arbitrary, but should be positive. Larger values of D yield more precise dependency graphs, at the cost of higher computational complexity. Further set a bound $\epsilon$ to control the precision of the labels of edges in dependency graphs. The value of $\epsilon$ is arbitrary, but should satisfy $0<\epsilon<1$. Smaller values of c yield more precise dependency graphs, at the cost of higher computational complexity.

The graph Widen(G), where G=(V, E, S, Eq) is a dependency graph, is defined as G'=(V, E', S', Eq). The function S' is defined by S'(A)=S(A) if S(A)<MAX, and S'(A)=∞ otherwise. Furthermore, for each edge (A, x, B) in E such that x<D, E' comprises the edge (A, y, B), where y=round(x/$\epsilon$)*$\epsilon$, and round(z) is the nearest integer to z. Termination of the algorithm is guaranteed by applying Widen(G) to the graphs of relations in recursive components, at each iteration of the fixpoint computation. The computation of nonrecursive components is not affected.

Refinements

The inference algorithm for dependency graphs can be extended in a number of ways to provide better estimates of size in certain cases. The following section discusses two such possible extensions to the algorithm.

Refinement: Functional Dependencies

The algorithm may first be extended to compute functional dependencies. A functional dependency from a field A to a field B, written A➔B, indicates that the value of the field A uniquely determines the values of the field B in each record. The computation of such dependencies is advantageous for a number of optimizations. The dependency graph algorithm may be extended to generate functional dependencies. These are recorded in an additional component of dependency graphs, so a dependency graph now takes the form (V,E,S,Eq, F) where F is a set of functional dependencies. Functional dependencies may be recorded for relations in the data source by user annotation. In addition, whenever a field A is a key of a relation, then the dependency A➔B may be recorded for all fields B of the relation.

Each operation on dependency graphs can be updated to handle the extra component for functional dependencies. The normalization procedure is modified as follows. If G=(V, E, S, Eq, F), then the functional dependencies component F' of the normalized graph G'=(V', E', S', Eq', F') is obtained from the set $\{A' \rightarrow B' | A \rightarrow B \in F \wedge A=A' \in Eq' \wedge B=B' \in Eq'\}$ by repeatedly adding the dependency $A \rightarrow C$ whenever dependencies $A \rightarrow B$ and $B \rightarrow C$ lie in this set. In the intersection or Cartesian product of two graphs, the functional dependencies of the result are the union of the functional dependencies of the graphs. In the union of two graphs, the result has no functional dependencies. In the projection of a graph on a set of fields X, the functional dependencies of the result are those dependencies $A \rightarrow B$ in the source graph such that $A \in X$ and $B \in X$. Extending a graph, adding an equality or setting a field to a constant do not affect functional dependencies. The dependencies of the renaming of G=(V, E, S, Eq, F) by $f$ are $\{f(A) \rightarrow f(B) | A \rightarrow F\}$. Finally, Top(Fields) has no functional dependencies, while the functional dependencies of Bottom(Fields) are $\{A \rightarrow B | A, B \in Fields\}$. As the above are the only operations on dependency graphs, this suffices to extend the algorithm to compute functional dependencies.

Refinement: Improving Estimates for Recursive Predicates

Another extension to the algorithm improves the handling of recursive predicate definitions. The algorithm as discussed above handles recursive definitions, but the size estimate for a recursive predicate may be much higher than the real size of the predicate. The present extension to the algorithm is intended to improve the accuracy of size estimates of recursive predicates that involve relations such that some information is known about the length of paths in the graph defined by such a relation. Such relations occur frequently in real data; an example is the containment relationship:

---
hasPart(X, Y)     // element X comprises part Y
---

It is likely that most paths in the graph defined by hasPart are relatively short. As an example, a domain expert may determine that most paths in hasPart have length at most three, where a path in hasPart is a sequence $x_1, \ldots, x_n$ where hasPart($x_i, x_{i+1}$) for each i. That is to say, the typical nesting depth of parts is three. Such information can frequently be obtained by domain experts.

Suppose, for the sake of illustration, that the dependency graph for hasPart records the information: X has size 1000, Y has size 1000, and that the dependencies are (Y, 1, X) and (X, 3, Y) encoding the fact that each subpart is contained in one part, and on average each part comprises three subparts. Then consider the transitive closure of hasPart:

---
hasPartPlus(X, Y) :-
    hasPart(X, Y) ;
    hasPart(X, Z), hasPart(Z, Y)
---

The algorithm as discussed above, with the appropriate use of widening, infers the maximum sizes for the X and Y fields of hasPartPlus, and no dependencies between X and Y. This is a consequence of the approximations used in the computation of dependency graphs. However, the hasPartPlus relation is substantially smaller than the inferred size. This can be seen from the fact that most paths in hasPart have length at most three, as specified by the domain expert. This extension to the algorithm is concerned with handling such cases automatically.

Two annotations of the database schema are added. First, a path order may be defined. Such a definition introduces an order<say, together with the length of this order, written l(<). Then, for each pair of fields A and B of relations in the data source, the annotation A<B may be added. This annotation indicates that in any record, the value of field A precedes the value of field B in the <order. One can then say that A and B have an order relation. In the hasPart example, an order<of length three may be introduced. The intended meaning of <is that x<y whenever x comprises y. The annotation X<Y may then be added to the hasPart relation.

The inference algorithm of dependency graphs may then be modified to take orders into account. The definition of dependency graphs is updated so that whenever X and Y are fields with an order relation X<Y, the form of edges from X to Y is (X, x, Y, i), where $i \geq 1$ is an integer. The intention is that i represents the length of a path from X to Y. Edges (X, x, Y, i) and (X, x, Y, i') are considered distinct whenever $i \neq i'$. The normalization operation on graphs is then updated as follows. Suppose that G=(V, S, E, Eq) is a dependency graph, and suppose that G'=(V, S', E', Eq') is the result of normalizing G. The S' and Eq' components are computed as before; E' can be computed as follows. For each edge (A, x, B) or (A, x, B, i) in E, and each pair of vertices A' and B' such that Eq' comprises constraints of the form A=A' and B=B', add the edge (A', x, B') (respectively (A', x, B', i)) to E'. For each pair of edges (A, x, B) (or (A, x, B, i)) and (B, y, C) (or (B, y, C, i')) in E' such that at least one of the edges does not comprise a path length component, add the edge (A, xy, C) to E'. Finally, for each pair of edges (A, x, B, i) and (B, y, C, j) in E' such that $i+j \leq l(<)$, add the edge (A, x, B, i+j) to E'. No other operation needs to be modified to take advantage of path orders.

If the normalization procedure is modified in the above manner, paths along fields that have an order relation are limited by the length of the order relation, and in this way better approximations of the sizes of recursive predicates are obtained.

Refinement: Using Disjointness

A further refinement to the procedure discussed herein improves the accuracy of computed estimates for disjunctions. The refinement aims to take disjointness information into account to improve estimates for unions. As an example, consider the following program:

---
// Extensional relation: father(x,y), meaning x is the father of y
// Extensional relation: mother(x,y), meaning x is the mother of y
parent(x, y) :- father(x, y) ; mother(x, y).
---

Suppose for the sake of the example that the following information has been supplied by the database designer: the dependencies for both father and mother are the same, namely that there are 1000 distinct values of x, 2000 distinct values of y, and on average two distinct values of y for each value of x. Then the size inference procedure would estimate that for parent there are on average 4 values of y for each value of x.

However, suppose that it is known that the values of field x in the relations father and mother are disjoint, so that no element can both be a father and a mother. Then for each value of x in parent, that value must unambiguously either lie in father or mother. There are therefore only two values of y for each value of x in parent. Thus using the information that the x fields of father and mother take disjoint sets of values, the estimate of the size of parent can be improved substantially.

The use of disjointness to improve the results of the analysis is now discussed in more detail. Once can state that two relations with the same set of fields, say R and S with fields $(X_1, \ldots, X_n)$ are disjoint on $X_i$ if for any tuple $(r_1, \ldots, r_n)$ in R and any tuple $(s_1, \ldots, s_n)$ in S, $r_i \neq r_j$. That is, values of field Xi in the two relations are always distinct.

One can further assume that the program is annotated so that individual disjunctions in the program are marked with disjointness information of the following form: for each disjunction A∪B an annotation that A and B are disjoint on a set of fields Xs can be added to the disjunction. The meaning of this annotation is that regardless of the contents of relations in the relational data source, and for any field X in Xs, the computed relations for A and B are disjoint on X.

Disjointness annotations can be computed using one or more of a variety of means that are independent of the various embodiments of the present invention: for instance, the types of the variable X in A and B can be used, so that if the types are disjoint, then A and B are disjoint on X. Alternatively, theorem provers, SAT solvers, binary decision diagrams or other means of evaluating logical formulas can be used to prove that the values of X in A and B are disjoint.

To use disjointness annotations whenever present, the operation of union on dependency graphs must be updated. Consider the union of two graphs $G_1=(V_1, E_1, S_1, Eq_1)$ and $G_2=(V_2, E_2, S_2, Eq_2)$, where the union is marked are disjoint on a set of fields Xs. Then the result is the graph G=(V, E, S, Eq) defined as follows. The set of vertices, equalities and sizes of columns in the result is computed as previously defined for the union operation. The set of edges in the result is defined as follows: for any pair of fields X and Y such that $E_1$ comprises an edge (X, a, Y) and $E_2$ comprises an edge (X, b, Y), the result comprises an edge (X, z, Y), where z is defined in one of two ways. First, if X is not marked as disjoint in the union, then $z=(a*S_1(X)+b*S_2(X))/(\max(S_1(X), S_2(X)))$. If X is marked as disjoint in the union, then $z=(a*S_1(X)+b*S_2(X))/(S_1(X)+S_2(X))$.

Since $S_1(X)+S_2(X)$ is always greater than or equal to max $(S_1(X), S_2(X))$, the dependency computed for in the case that the field is marked as disjoint is smaller, corresponding to the intuition illustrated for the parent example above. For instance, the computed dependency in the parent example from x to y is $(1000*2+1000*2)/(1000+1000)=2$.

This refinement interacts with a previously discussed refinement, namely the computation of functional dependencies. This refines the procedure in one way. To compute the functional dependencies of a union, compute the functional dependencies of the two sides of the union, say $F_1$ and $F_2$. Then the result comprises a functional dependency A →C if, and only if, both $F_1$ and $F_2$ comprise the functional dependency A →C and the union is marked as disjoint on A. Disjointness only affects union, so no other operations need to be refined.

Approximating the Size of a Relation

Assuming that a dependency graph has been computed for an expression E in the manner discussed above, the following procedure yields an estimate of the size of the relation denoted by the expression E. The dependency graph of E is denoted by G=(V, E, S, Eq) and is assumed to be normalized. If it is desired to apply these operations to a graph that is not normalized, then the normalization operation should be applied first.

In order to compute an estimate of the size of E, create a directed graph H with vertices V∪{●} for some special node ● not in V. The edges of H are all edges in E, together with edges (●, S(A), A) for each A in ●. A tree in H is a subgraph T of H such that: there are no two edges in T with the same target, and T does not comprise a cycle, defined as a path in T with the same start and end vertices. T is a spanning tree of H if T comprises a path from ● to each other node. Any graph H constructed in the way discussed above is guaranteed to comprise a spanning tree. The weight of a spanning tree T of H is the product of the labels of edges appearing in T. The estimate of the size of E is the least weight of a spanning tree of H. A spanning tree with minimal weight is known as a minimal spanning tree.

Figure 9:
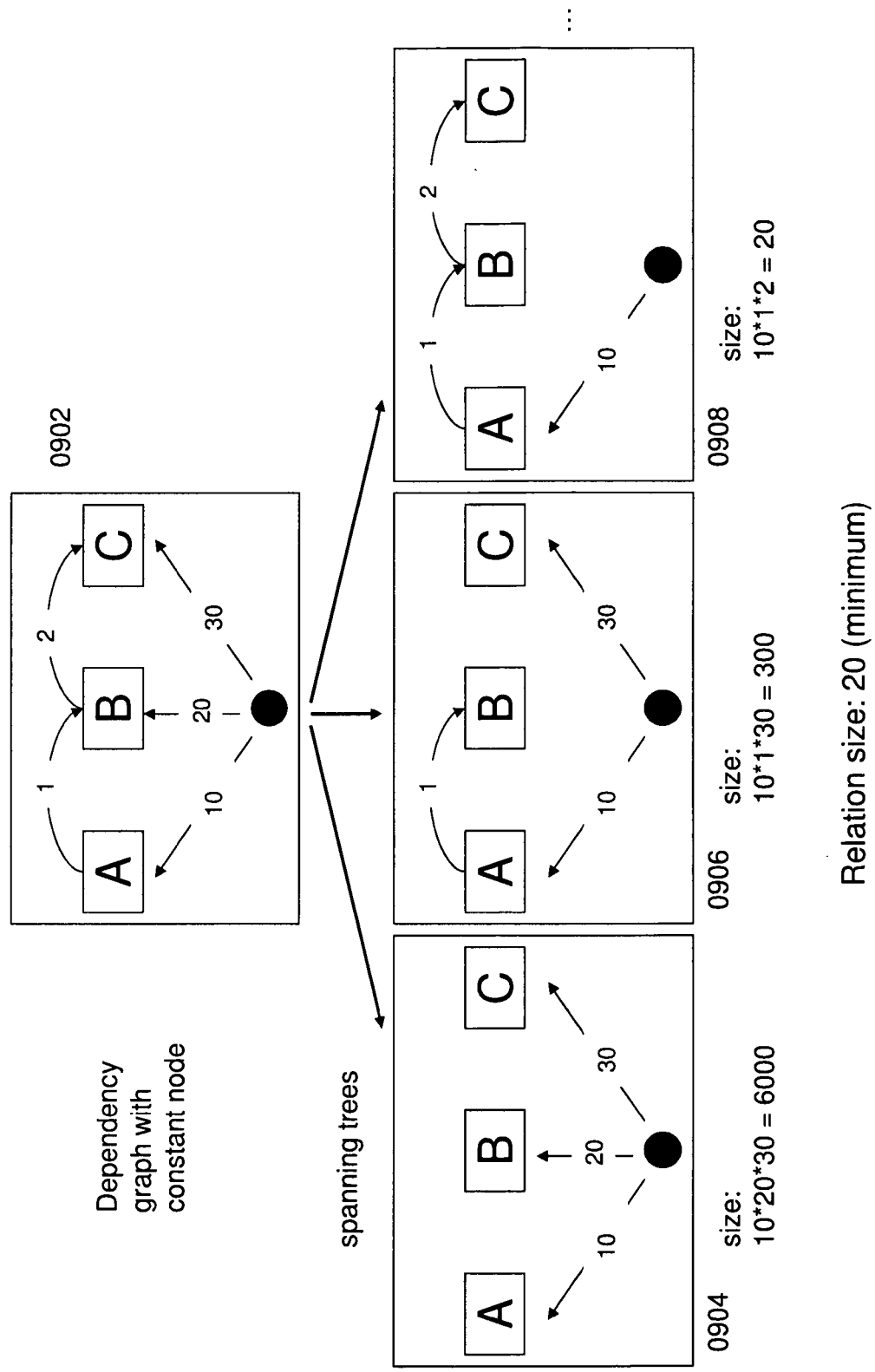
FIG. 9 illustrates the computation of an estimate of the size of a relation using a dependency graph for that relation according to one embodiment of the present invention.

FIG. 9 illustrates one procedure that the query approximator 010 performs for computing the size of a relation. The graph H 0902 is depicted for a simple dependency graph for a relation with three fields A, B and C. Three spanning trees 904, 0906, and 0908 of H are shown. There are other spanning trees of H, not depicted here. The weights of the spanning trees are respectively 6000, 300 and 20. The spanning tree 0908 with weight 20 is in fact a minimal spanning tree for H, so the estimated size of the relation is 20.

This procedure may be realized by enumerating all spanning trees for H and computing the weight of each spanning tree. This procedure is however inefficient. Efficient procedures for computing minimal spanning trees of directed graphs are known. One such procedure, *Edmonds' algorithm*, was discussed in *Jack Edmonds, Optimum Branchings (Journal of Research of the National Bureau of Standards—B. Mathematics and Mathematical Physics,* 71B(4):233-240, October-December 1967), which is hereby incorporated by reference in its entirety.

Edmonds' algorithm computes the spanning tree minimizing the sum of the weights of edges. However, it may be adapted to the problem discussed above by replacing addition by multiplication in the description of the algorithm, and using 1, rather than 0, as the weight of an empty edge.

Applications to Optimization

The dependency graphs computed by the above procedure may fruitfully be used to guide optimizations for queries. Several uses of dependency graphs are discussed as used to implement the magic rewriting transformation as example uses of one or more embodiments of the present invention for optimization purposes. It should be understood that the various embodiments of the present invention are not limited to magic rewriting. In particular, another use of the procedures discussed below is to find a good order of subterms of a query for efficient evaluation of that query.

The Size of a Relation in Context

The optimizations discussed herein use the estimate of the size of a subpart of a query, in the context in which the query part appears, as an estimate of the cost of the subpart of the query. Cost estimates are used to find optimal evaluation strategies. A context for a query part P is a set of query parts such that replacing P in the query by the conjunction of P with all parts in the context would not affect the results of the query.

Figure 10:
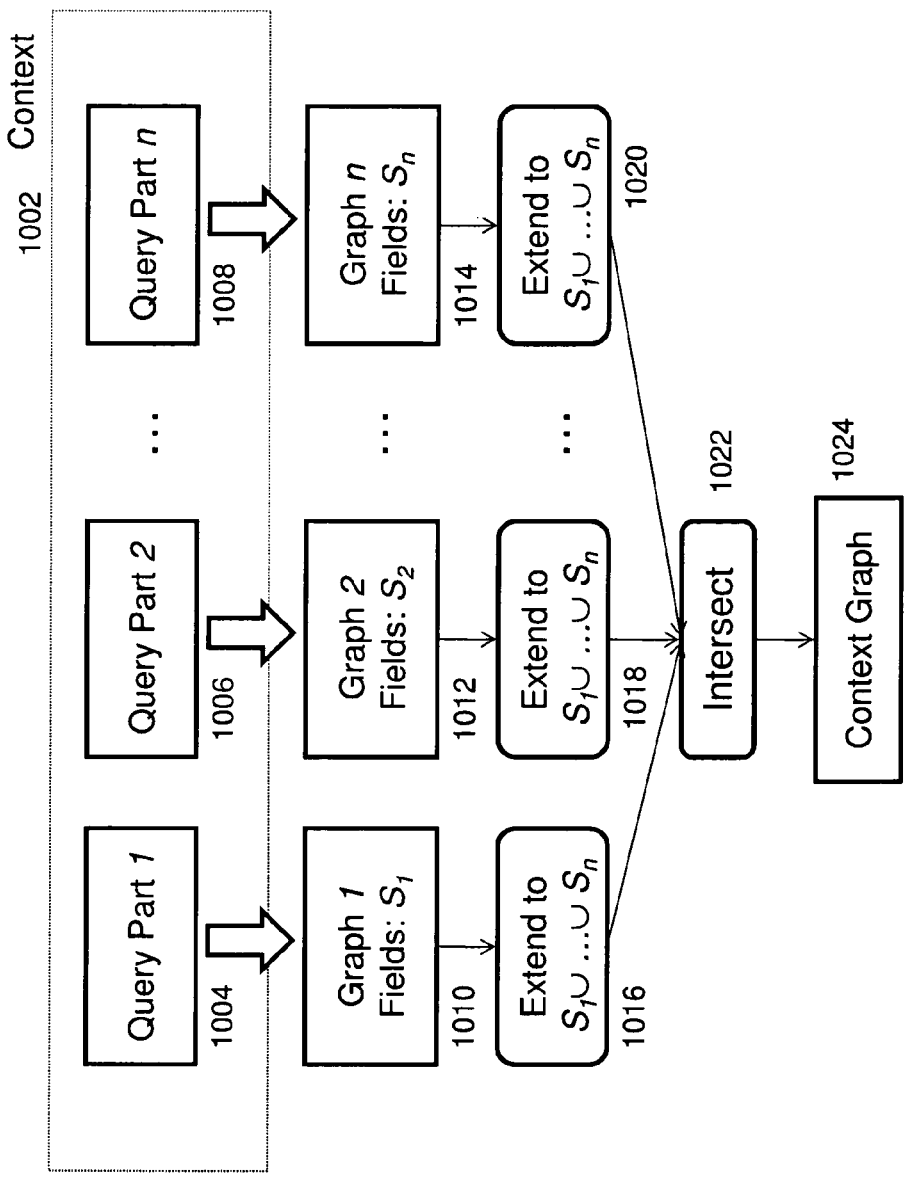
FIG. 10 illustrates the computation of a dependency graph of a context, where a context is a set of relations, according to one embodiment of the present invention

Given a context S, the context graph for S is computed in the manner illustrated in FIG. 10. The context (1002) consists of n query parts (1004 to 1008). For each query part, the dependency graph of this part is to be computed in the manner discussed above (1010 to 1014). Each dependency graph has a set of fields, given by the vertices of the graph; call the union of these S. Extend each graph to the set of fields S (1016 to 1020), and finally compute the intersection of the resulting graphs (1022). The result is the graph for the context (1024). Any graph which may be obtained in the method above, or a method equivalent to it, is called a context graph.

Figure 11:
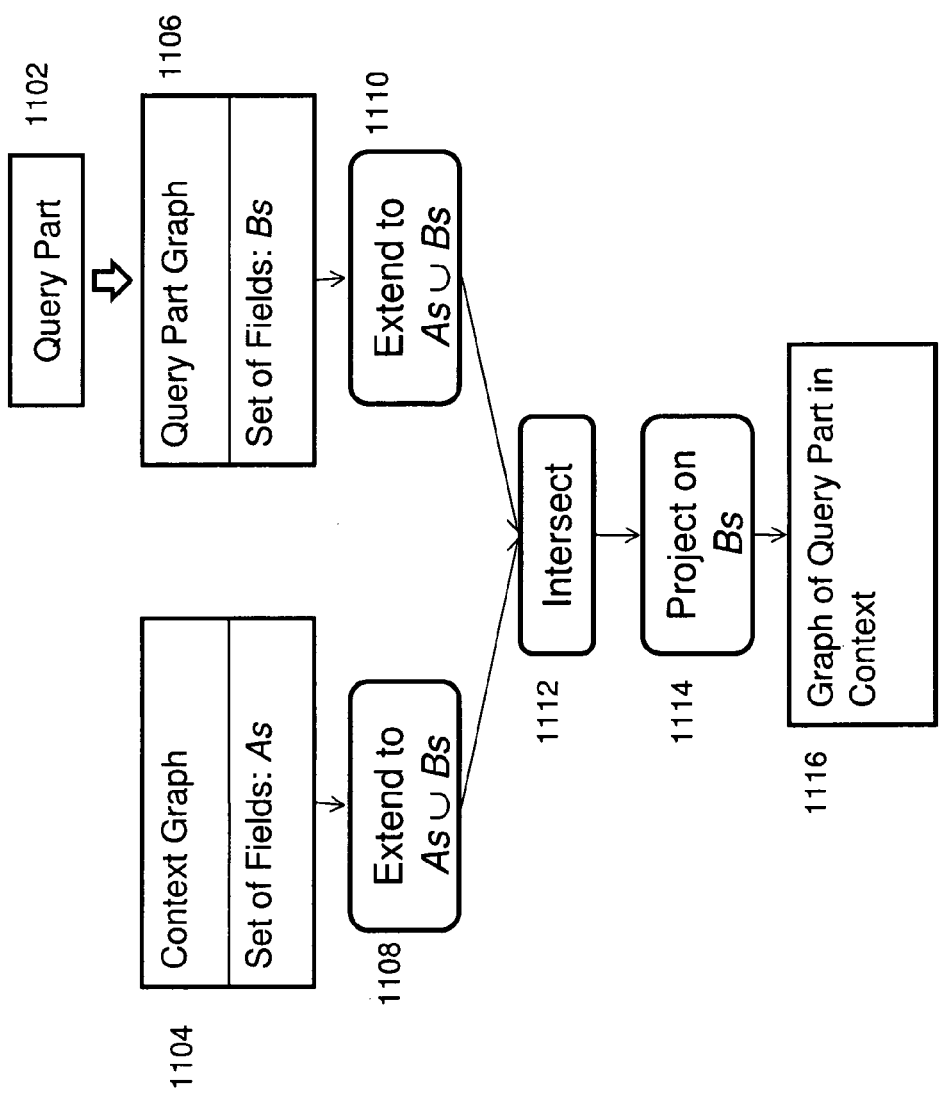
FIG. 11 is a diagram defining a dependency graph of a relation in a context, where the context is given by a dependency graph, according to one embodiment of the present invention.

If P is a query part, and G is a context graph, then the graph of P in context G is defined as follows and illustrated in FIG. 11. The dependency graph of P is first computed (1106). Let As and Bs be the sets of fields of G and the graph of P (respectively). Then extend G and the graph of P to the set of fields As∪Bs (1108 and 1110). The resulting graphs are then intersected (1112). Finally, project the resulting graph on the set of fields Bs (1114) to obtain the graph of P in context G.

Given any context graph and query part P, the size of P given G is the estimated size of the graph of P in context G, where the graph of P in context G is as defined above, and a procedure such as the one discussed in this invention is used to estimate the size of the relation given the graph. This is written Size(P|G) and is an estimate of the size of the relation denoted by P, given that it is used in a context discussed by G. If C is a context; then the size of P given C, written Size(P|C) is defined by: Size(P|∅) is the size of P and otherwise Size (P|C)=Size(P|G), where G is the graph of C Magic Rewriting The magic rewriting transformation is a standard technique for optimizing relational queries. The state of the art is briefly discussed herein to facilitate the description of the application of one or more embodiments of the present invention to the technique. Many other descriptions of the transformation can be found in at least in *Bancilhon, Maier, Sagiv and Ullman, Magic Sets and Other Strange Ways to Implement Logic Programs, Proceedings of the Fifth ACM SIGACT-SIGMOD Symposium on Principles of Database Systems*, 1986, which is hereby incorporated by reference in its entirety.

To illustrate the magic rewriting transformation, an example database schema is introduced and is shown below with informal interpretations of relations. The data within in this database is intended to provide a representation of object-oriented programs.

| type(T) | // T is a type |
| method(M, T) | // M is a method declared in type T |
| hasName(E, N) | // element E has name N |
| hasSubtype(T, SUB) | // type T has subtype SUB |

Consider the program shown below, where the query is defined by the relation query, and the notation of the query language Datalog is used:

```
query(C) :-
    type(Cloneable),
    N = "Cloneable",
    hasName(Cloneable, N),
    hasSubtypePlus(Cloneable, C),
    not(M = "clone", declaresMethod(C, M)).
hasSubtypePlus(SUPER, SUB) :-
    hasSubtype(SUPER, SUB) ;
    (hasSubtypePlus(SUPER, MID), hasSubtype(MID, SUB)).
declaresMethod(C, Name) :-
    method(M, C),
    hasName(M, Name).
```

An important source of inefficiency in the execution of this program is the fact that the declaresMethod and hasSubtypePlus relations are computed, but only a small part of each relation is used: for instance, hasSubtypePlus computes the transitive closure of the subtype relationship in the program, but only subtypes of any type with name "Cloneable" need to be computed for the evaluation of the query.

The magic-sets rewriting transformation modifies the definitions of relations to include query parts from the contexts in which relations are used. This may be achieved in a manner that does not affect the results of the query. The result of applying the magic rewriting procedure to the above program is shown below:

```
query(C) :-
    type(Cloneable),
    N = "Cloneable",
    hasName(Cloneable, N),
    hasSubtypePlus^{bf}(Cloneable, C),
    not(M = "clone", declaresMethod^{bb} (C, M)).
m_hasSubtypePlus^{bf}(SUPER) :-
    N = "Cloneable",
    hasName(SUPER, N).
hasSubtypePlus(SUPER, SUB) :-
    (m_hasSubtypePlus^{bf}(SUPER), hasSubtype(SUPER, SUB)) ;
    (m_hasSubtypePlus^{bf}(SUPER),
     hasSubtypePlus(SUPER, MID), hasSubtype(MID, SUB)).
m_declaresMethod^{bb}(C, Name) :-
    hasSubtypePlus^{bf}(Cloneable, C),
    Name = "clone".
declaresMethod(C, Name) :-
    m_declaresMethod^{bb}(C, Name),
    method(M, C),
    hasName(M, Name).
```

Magic rewriting changes the program in several ways. First, for each use of a subquery, a subset of the fields of the subquery are annotated as bound. For each combination of annotations of bound fields, a copy of the subquery is created. In the above example, there is just one copy of each subquery: hasSubtypePlus$^{bf}$ (the hasSubtypePlus subquery with its first field bound), and declaresMethod$^{bb}$ (the declaresMethod subquery with both fields bound). The collection of bound fields at a use of a subquery is called the boundedness type of the use.

For each use of a subquery, a subset of the query parts that appear in the same conjunction as the use, but to the left of it, is selected. This is called the magic set of the use. In the above example, the magic set of the first use of hasSubtypePlus consists of the query parts N="Cloneable" and hasName(SUPER, N).

For each copy of a defined relation R with a boundedness type that includes at least one bound field, a new defined relation, called the magic relation of R, is created. The fields of the magic relation are the fields of R that are marked as bound, and the relation is defined as the disjunction of all magic sets of uses of R at this boundedness type. In the above example, the magic relation of hasSubtypePlus$^{bf}$ is m_hasSubtypePlus$^{bf}$, and that of declaresMethod$^{bb}$ is m_declaresMethod$^{bb}$. In both cases, there is just one use of the relation, so the magic relation simply consists of the magic set at this use.

Finally, each copy of a relation R with a boundedness type that includes at least one bound field is rewritten to denote the logical conjunction of R with the appropriate magic predicate. In the above example, this is reflected for instance in the use of m_declaresMethod$^{bb}$ in declaresMethod$^{bb}$.

The rewritten program is substantially more efficient to execute over a relational data source, as intermediate relations are restricted to those contexts in which they are useful. The magic rewriting procedure is highly generic, and some parts of the algorithm can be refined to obtain a concrete implementation. In the above discussion, these are: the determination of the boundedness type of each use of a subquery; and the determination of the magic set of each use of a subquery.

A further requirement of magic rewriting is an appropriate order of subparts within a query. This is because subparts are considered in the order in which they appear in order to determine the magic set of a use. To illustrate the need for a good order of parts within a query, consider the following variation of the above query:

```
query(C) :-
    type(Cloneable),
    not(M = "clone", declaresMethod(C, M)),
    hasSubtypePlus(Cloneable, C),
    hasName(Cloneable, N),
    N = "Cloneable".
hasSubtypePlus(SUPER, SUB) :-
    hasSubtype(SUPER, SUB) ;
    (hasSubtypePlus(SUPER, MID), hasSubtype(MID, SUB)).
declaresMethod(C, Name) :-
    method(M, C),
    hasName(M, Name).
```

While this is equivalent to the original query, it is no longer the case that this program can benefit from magic rewriting, since all useful contextual information for hasSubtypePlus and declaresMethod appears after the uses of these relations.

In the following sections, it is shown how the various embodiments of the present invention can be used to provide effective procedures for the problems listed above with the magic transformation: (1) to reorder parts within a conjunction to find a good order for magic rewriting; (2) to determine the magic set of each use of a relation; and (3) to determine the boundedness type of each use of a relation. These collectively represent a radical improvement over conventional systems in the implementation of magic rewriting.

The Use of Dependency Graphs to Reorder Query Parts

Figure 12:
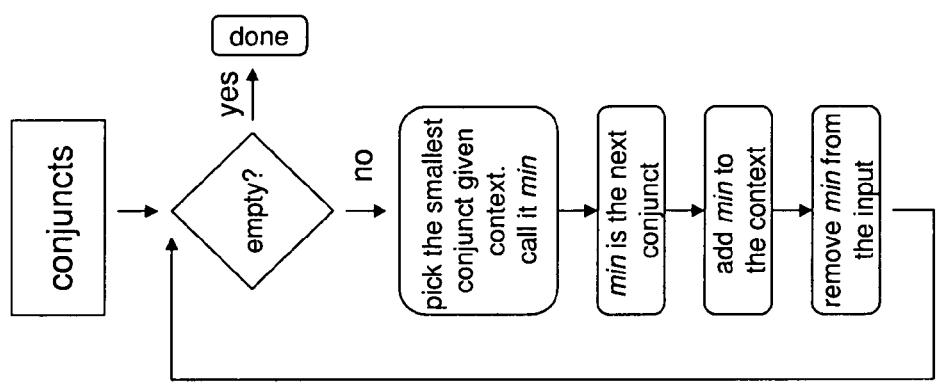
FIG. 12 is a flow chart showing how a conjunction of queries may be reordered using approximate size information according to one embodiment of the present invention.

Consider a conjunction of query parts $Q_1 \cap Q_2 \cap \ldots \cap Q_n$, where each $Q_i$ is written as an expression of relational algebra. The procedure outlined below finds an alternative order for the parts in the conjunction to improve magic rewriting. The procedure is illustrated in FIG. 12. First, define context=Ø, conjuncts={$Q_1, \ldots, Q_n$} and result to be the empty sequence. Next, repeat the following until conjuncts is empty. For each Q∈conjuncts, compute Size(Q|context). Let $Q_{min}$ be the conjunct that minimizes this value. Remove $Q_{min}$ from conjuncts; add $Q_{min}$ to the end of result, and add $Q_{min}$ to context. This procedure is mathematically guaranteed to terminate and to set result to a permutation of the original list of conjuncts. This permutation is the order that should be used to traverse the conjunction in magic rewriting. A refinement to this procedure is to iterate over all possible choices of $Q_i$ for the first element of result, remove the choice of $Q_i$ from conjuncts, and run the above procedure for each such choice. This produces n possible orders of the conjuncts; any order among those that minimizes the maximum value of Size ($Q_i$|context) over i can be selected.

The Use of Dependency Graphs to Determine Magic Sets

Figure 13:
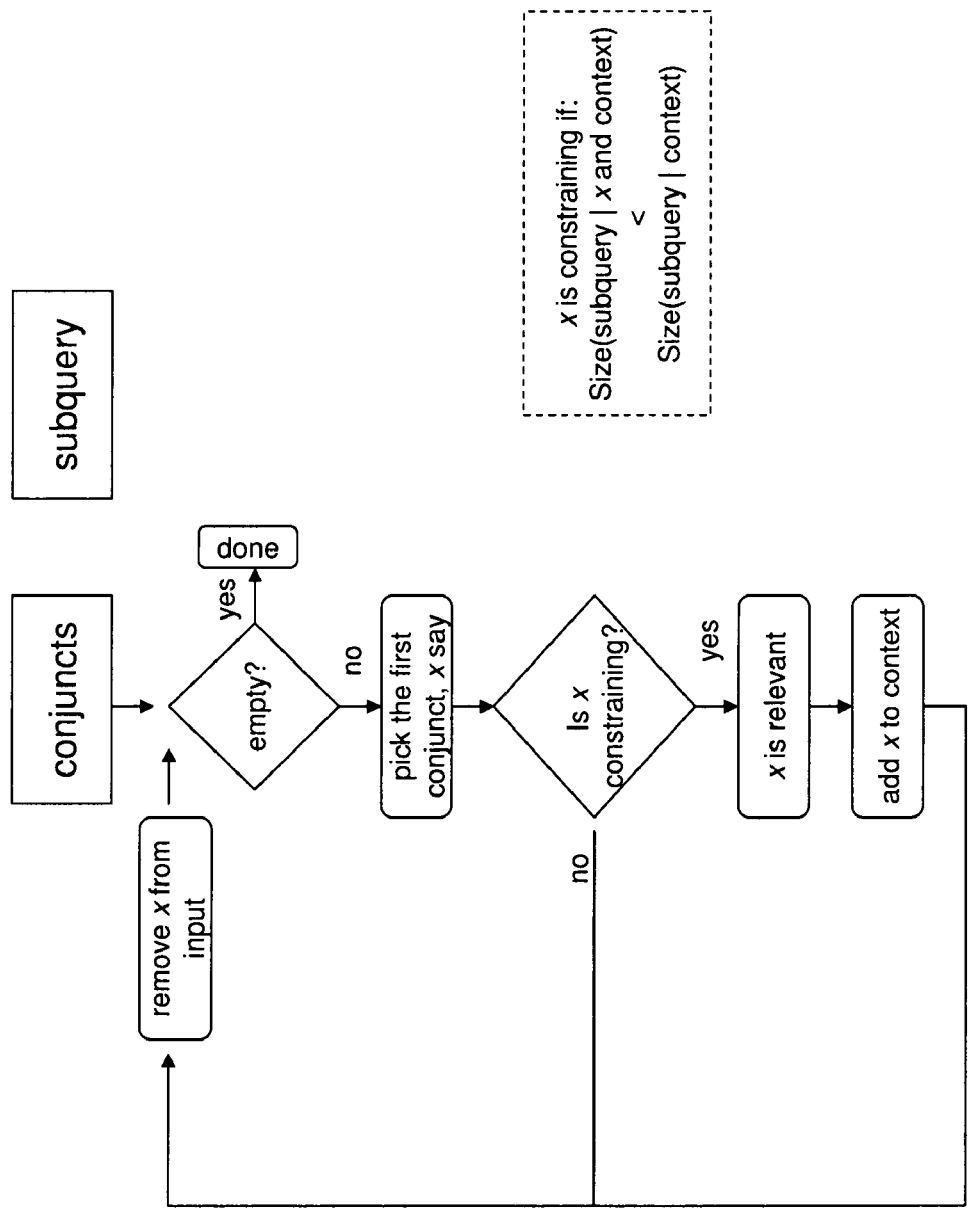
FIG. 13 is a flow chart showing one process that identifies the parts of a query that are relevant to the evaluation of a given subquery using approximate size information according to one embodiment of the present invention.

Consider a use U of a subquery that occurs in a conjunction after conjuncts $Q_1, \ldots, Q_n$ (possibly after reordering the conjunction using the above procedure). A method is now discussed to determine a subsequence of $Q_1, \ldots, Q_n$ to be used as the magic set of U. This is illustrated in FIG. 13. First, define context=Ø and result to be the empty sequence. Next, consider each conjunct $Q_i$ in order and proceed as follows. Compute A=Size(U|context) and B=Size(U|context∪{$Q_i$}). If B<A, then add $Q_i$ to the end of the sequence result. This procedure terminates with result comprising a subsequence of $Q_1, \ldots, Q_n$. This subsequence is the magic set of the use U.

A variation of this procedure can be defined to reduce the effects of imprecision in the size estimation procedure. Define a constant T such that 0<T≦1. Then the test B<A in the above procedure may be replaced by B<T*A without affecting the correctness of the algorithm. This modification may improve the results of the algorithm, in particular for T close to 1.

The Use of Dependency Graphs to Determine Boundedness Types

Figure 14:
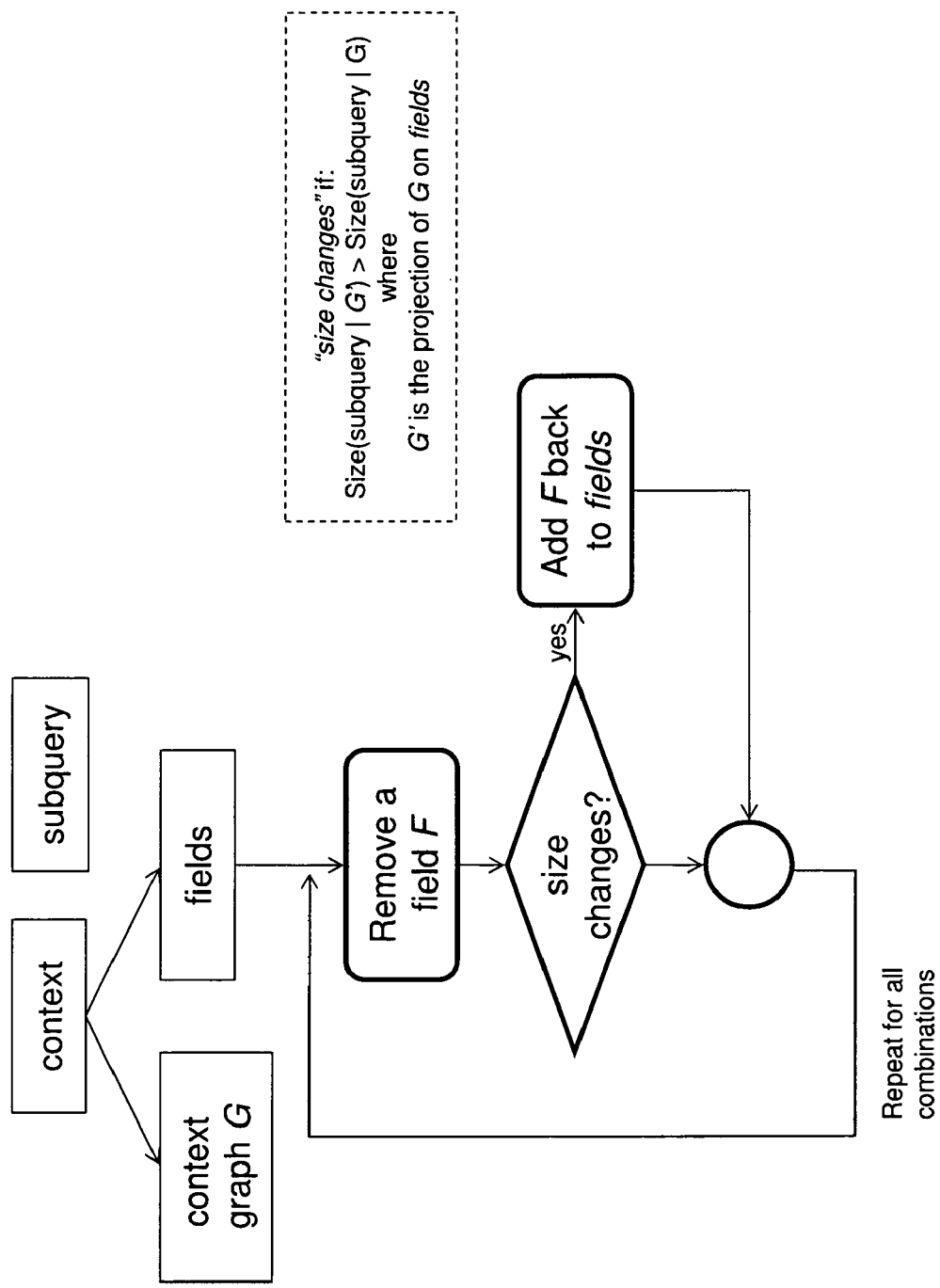
FIG. 14 is a flow chart showing one process that identifies the fields of a subquery that are bound by the use of this subquery according to one embodiment of the present invention.

Finally, consider a use U of a subquery, with magic set $Q_1, \ldots, Q_k$. This magic set may for instance have been determined using the method discussed above. Suppose that U is a use of a subquery defined by a relation $R(X_1, \ldots, X_n)$. The present procedure computes a subset of $[X_1, \ldots, X_n]$, intended to be used as the boundedness type of the use U. This procedure is illustrated in FIG. 14.

If the magic set is empty, then the boundedness type is Ø: no variables are bound. Otherwise, let G be the context graph obtained from the context $Q_1, \ldots Q_n$, and set fields=Fields (G), representing the fields used in the context. Repeat the following procedure: Set fields'=fields. For each X∈fields, let G' be the projection of G on fields'\{X}.Then compute A=Size(U|G') and B=Size(U|G). If A=B, remove X from fields'; If fields'=fields, then the procedure halts; otherwise, set fields=fields' and repeat. This procedure terminates, with fields comprising a subset of the fields used in the context. Let $f$ be the renaming associated with U. The boundedness type of U is then $\{f^1(A)|A \in fields\}$. A variation of this procedure can be defined as before to reduce the impact of errors in the size estimation procedure. Define a constant T≧1. Then the test A=B in the procedure above may be replaced with A≦T*B without affecting correctness. This may be beneficial, in particular if T is close to 1.

OTHER EMBODIMENTS

The present invention can also be embodied in any system for evaluating queries, where the queries are expressed in a language based on Datalog or a variant of Datalog. Candidates are object-oriented Datalog, Datalog with aggregate features, and more generally any visual or textual language whose surface syntax is not necessarily Datalog, but whose main constructs translate to Datalog or to relational algebra. Another particular embodiment of the invention is as part of a traditional relational database system: the queries are phrased in SQL, and the method estimates the sizes of queries in SQL.

A traditional relational database is but one example of a data source (an entity that provides relations to be queried). The various embodiments of the present invention can also be used in an environment where the data source consists of a variety of multiple data sources, possibly including a relational database, a web service, a web page, or a file on hard disk.

Another embodiment of the present invention is a networked system where the flow of data is modeled with Datalog queries, and the size estimation and optimizations are applied to optimize that flow of data. In such a system, the queries can be regarded as the description of a network architecture or routing protocol. Another embodiment of the present invention is a decision-support system, where the Datalog queries are used for the purpose of extracting predictive rules from a large set of data items (such as shopping information), and Datalog queries are also used to then analyze new data to make decision recommendations.

Above a detailed discussion was given as to how the various embodiments of the present invention can be used in an implementation of the magic sets transformation. Those skilled in the art will recognize that this is but one example of an optimization that can benefit by the method of deriving accurate size estimates that is at the core of this invention. For example, it could be used to guide the inlining transformation. Inlining is the process of replacing a call to a named subquery by the body of that subquery. Whether that transformation (or its inverse, which creates a new named subquery) is an optimization can be predicted based on the size of the resulting relations. It is always an improvement, for example, to apply the inlining transformation if the result of the subquery is very small. Another application is to reorder query parts for efficient evaluation, since efficiency of query evaluation may depend on the order in which query parts are evaluated. Also, a procedure for reordering query parts in the context of the magic sets transformation was discussed, but this same procedure can be used to reorder query parts to determine an efficient order for evaluation.

The various embodiments of the present invention can be used for other purposes than just optimization of queries, and one example is more accurate type checking. In "Type Inference for Datalog and its application to Query Optimization" by O. de Moor, D. Sereni, P. Avgustinov and M. Verbaere, 27$^{th}$ Symposium on Principles of Database Systems, 2008, which is hereby incorporated by reference in its entirety, it is shown how one may compute an approximation of the set of results of a query without actually inspecting the contents of the data source. A query that is guaranteed to have an empty result, based on that approximation, is deemed to be an error. Using the method of deducing functional dependencies discussed above, one can make such approximations yet more accurately, thus yielding a more accurate method of type checking of queries.

Non-Limiting Hardware Examples

Overall, the various embodiments of the present invention can be realized in hardware or a combination of hardware and software. The processing system according to a one embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods discussed herein—is suited. A typical combination of hardware and software is a general-purpose computer system with a computer program that, when loaded and executed, controls the computer system such that it carries out the methods discussed herein.

An embodiment of the processing portion of the present invention can also be embedded in a computer program product, which comprises all the features enabling the implementation of the methods discussed herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

Figure 15:
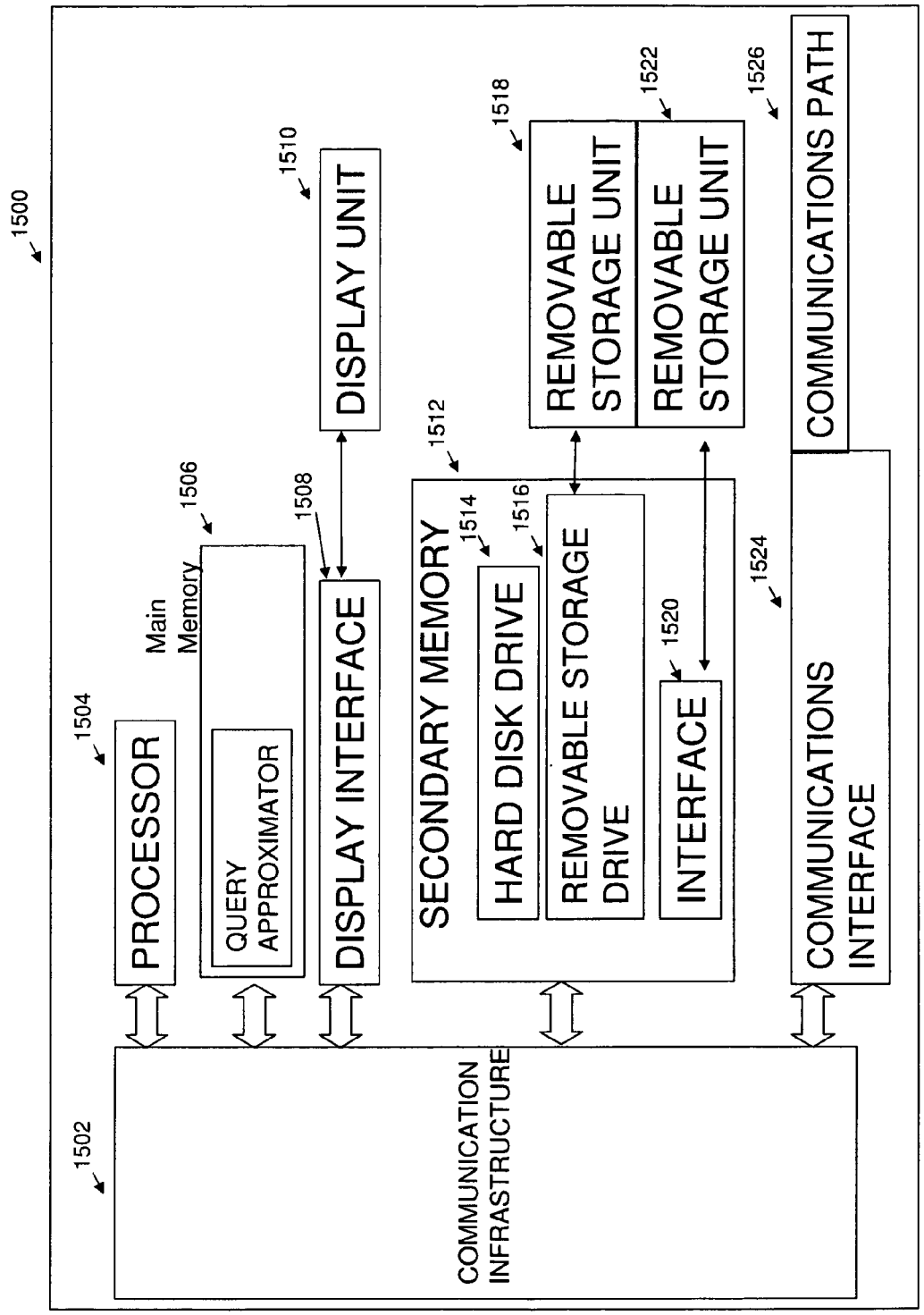
FIG. 15 is a block diagram of a computer system suitable for implementing the various embodiments of the present invention discussed herein according to one embodiment of the present invention.

FIG. 15 is a block diagram of a computer system useful for implementing the software steps of the present invention. Computer system 1500 includes a display interface 1508 that forwards graphics, text, and other data from the communication infrastructure 1502 (or from a frame buffer not shown) for display on the display unit 1510. Computer system 1500 also includes a main memory 1506, preferably random access memory (RAM), and optionally includes a secondary memory 1512. In one embodiment, the main memory 1506 includes the query approximator 0101 and its components discussed above with respect to FIG. 1. The query approximator 0101 performs the embodiments discussed above to accurately predict the sizes of results of queries so that the query can be optimized if needed. The secondary memory 1512 includes, for example, a hard disk drive 1514 and/or a removable storage drive 1516, representing a floppy disk drive, a magnetic tape drive, an optical disk drive, etc. The removable storage drive 1516 reads from and/or writes to a removable storage unit 1518 in a manner well known to those having ordinary skill in the art. Removable storage unit 1518, represents a CD, DVD, magnetic tape, optical disk, etc. which is read by and written to by removable storage drive 1516. As will be appreciated, the removable storage unit 1518 includes a computer usable storage medium having stored therein computer software and/or data. The terms "computer program medium," "computer usable medium," and "computer readable medium" are used to generally refer to media such as main memory 1506 and secondary memory 1512, removable storage drive 1516, a hard disk installed in hard disk drive 1514, and signals.

Computer system 1500 also optionally includes a communications interface 1524. Communications interface 1524 allows software and data to be transferred between computer system 1500 and external devices. Examples of communications interface 1524 include a modem, a network interface (such as an Ethernet card), a communications port, a PCM-CIA slot and card, etc. Software and data transferred via communications interface 1524 are in the form of signals which may be, for example, electronic, electromagnetic, optical, or other signals capable of being received by communications interface 1524. These signals are provided to communications interface 1524 via a communications path (i.e., channel) 1526. This channel 1526 carries signals and is implemented using wire or cable, fiber optics, a phone line, a cellular phone link, an RF link, and/or other communications channels.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer-implemented method for approximating a number of results returned by a query over a relational data source, the method comprising:

receiving, by an information processing system, a number of distinct values in each field of each relation in a relational data source, wherein the distinct values are a size approximation;

receiving, by the information processing system, a plurality of relationships between fields, where a relationship between a first field and at least a second field is a relationship approximation that approximates a number of distinct values stored in the second field for each value stored in the first field, and where the relationships between fields of a relation are given in a form of a graph whose vertices represent fields of a relation, and whose edges represent relationships between fields and edges are added to the graph using a database schema containing the relationships between fields;

producing, by the information processing system based on the size approximation and the relationship approximation, a query size approximation of the number of distinct values in each field of a result of a query; and producing, by the information processing system, based on the query size approximation, a query quantity approximation of a total number of distinct records in the result of the query without running the query against the relational data source.

2. The computer-implemented method of claim 1, where the approximation of the number of distinct values in fields of relations in the relational data source, and the relationship approximation between fields in the relational data source, are obtained by at least one of:

analyzing the relations in the relational data source;
analyzing a database schema; and
reading annotations provided by a database designer.

3. The computer-implemented method of claim 1, wherein the query is translated to relational algebra, and the approximation is computed by interpreting an operator of relational algebra as an operator on graphs representing dependencies between fields of relations.

4. The computer-implemented method of claim 1, wherein the graph is annotated with constraints indicating fields whose values are expected to be equal in any record in a relation.

5. The computer-implemented method of claim 1, wherein the graph comprises information recording functional dependencies between fields, where the first field is functionally dependent on one or more other fields if the values of the one or more other fields uniquely determine the value of the first field in any record.

6. The computer-implemented method of claim 5, wherein the query quantity approximation is used to improve accuracy of type checking of queries, and accuracy is improved by utilizing computed functional dependencies between fields.

7. The computer-implemented method of claim 1, wherein the graph is annotated with length constraints, where a length constraint between one field and another field denotes an expected length of a path in a graph with edge relation given by the one field and the other field.

8. The computer-implemented method of claim 1, wherein a disjunction in a query program receives annotations of disjointness information recording that sets of values of a field in both parts of the disjunction are disjoint, and this information is used to improve precision of the query quantity approximation computed.

9. The computer-implemented method of claim 8, wherein the disjointness information annotations are computed using one or more of:

computing types for fields in query parts, and using these types to deduce disjointness;
using a theorem prover to prove disjointness; and
using at least one of a satisfiability (SAT) solver and an algorithm using binary decision diagrams to prove disjointness.

10. The computer-implemented method of claim 1, wherein the relational data is stored in a plurality of data source formats including at least one of:

a relational database
a web service,
a web page, and
a file on hard disk.

11. The computer-implemented method of claim 1, wherein the query includes a plurality of parts, and wherein the query quantity approximation is used to change an order of parts within the query so as to find a good order for evaluating at least one join operation in the query, and the order is selected by minimizing sizes of parts of the query in a context in which these parts occur.

12. The computer-implemented method of claim 11, wherein the order of parts within the query is determined by:

keeping an approximation of the context in which a part of a query is used,
using the approximation of the context to approximate a number of results of a part of a query in the context in which it is used, and
repeatedly using the approximate of the number of results of query parts so computed to select a query part to evaluate.

13. The computer-implemented method of claim 1, wherein the query includes a plurality of parts and wherein the approximation is used to change an order of parts within the query so as to improve efficiency of further optimizations, and efficiency is improved by selecting an order minimizing sizes of parts of the query in a context in which these parts occur.

14. The computer-implemented method of claim 1, wherein the query quantity approximation is used to determine which parts of the query that are relevant to an evaluation of a subquery, where a part of the query is relevant if a conjunction of the part and the subquery is smaller than the subquery.

15. The computer-implemented method of claim 14, wherein the parts of the query that are relevant to the subquery are determined by:

considering all query parts that occur before a use of the subquery in order;
computing an approximation of the number of results of the subquery conjoined with a query part; and
selecting query parts such that an estimated number of results of the subquery conjoined with the query part is smaller than an estimated number of results of the subquery.

16. The computer-implemented method of claim 15, wherein the parts of the query that are relevant to the evaluation of a subquery are used to optimize the subquery via a magic rewriting optimizing transformation by:

including all relevant parts in a magic of the subquery, wherein the magic rewriting optimizing transformation operates by intersecting a subquery with a set of query parts without effecting of the subquery in each place in which it is used.

17. The computer-implemented method of claim 1, wherein the query quantity approximation is used to determine whether to apply one of an inlining transformation and an inverse of the inlining transformation, and wherein inlining is applied when an estimated size of a query part is below a particular threshold.

18. The computer-implemented method of claim 1, wherein at least one of the size approximation and relationship approximation is exact.

19. A system for approximating a number of results returned by a query over a relational data source, the system comprising:

a memory;
a processor communicatively coupled to the memory; and
a query approximator communicatively coupled to the memory and the processor, wherein the query approximator is adapted to:

receive a number of distinct values in each field of each relation in a relational data source, wherein the distinct values are a size approximation;

receive a plurality of relationships between fields, where a relationship between a first field and at least a second field is a relationship approximation that approximates a number of distinct values stored in the second field for each value stored in the first field, and where the relationships between fields of a relation are given in a form of a graph whose vertices represent fields of a relation, and whose edges represent relationships between fields, and edges are added to the graph using a database schema containing the relationships between fields;

produce, based on the size approximation and the relationship approximation, a query size approximation of the number of distinct values in each field of a result of a query; and produce, based on the query size approximation, a query quantity approximation of a total number of distinct records in the result of the query without running the query against the relational data source.

20. The system of claim 19, where the approximation of the number of distinct values in fields of relations in the relational data source, and the relationship approximation between fields in the relational data source, are obtained by at least one of:

analyzing the relations in the relational data source;
analyzing a database schema; and
reading annotations provided by a database designer.

21. The system of claim 19, wherein the query is translated to relational algebra, and the approximation is computed by interpreting an operator of relational algebra as an operator on graphs representing dependencies between fields of relations.

22. The system of claim 19, wherein the graph is annotated with constraints indicating fields whose values are expected to be equal in any record in a relation.

23. The system of claim 19, wherein the graph comprises information recording functional dependencies between fields, where the first field is functionally dependent on one or more other fields if the values of the one or more other fields uniquely determine the value of the first field in any record.

24. The system of claim 19, wherein the graph is annotated with length constraints, where a length constraint between one field and another field denotes an expected length of a path in a graph with edge relation given by the one field and the other field.

25. A non-transitory computer program product for approximating a number of results returned by a query over a relational data source, the computer program product comprising instructions for:

receiving a number of distinct values in each field of each relation in a relational data source, wherein the distinct values are a size approximation;

receiving a plurality of relationships between fields, where a relationship between a first field and at least a second field is a relationship approximation that approximates a number of distinct values stored in the second field for each value stored in the first field and where the relationships between fields of a relation are given in a form of a graph whose vertices represent fields of a relation, and whose edges represent relationships between fields, and edges are added to the graph using a database schema containing the relationships between fields;

producing, based on the size approximation and the relationship approximation, a query size approximation of the number of distinct values in each field of a result of a query; and producing, based on the query size approximation, a query quantity approximation of a total number of distinct records in the result of the query without running the query against the relational data source.

26. The non-transitory computer program product of claim 25, where the approximation of the number of distinct values in fields of relations in the relational data source, and the relationship approximation between fields in the relational data source, are obtained by at least one of:

analyzing the relations in the relational data source;
analyzing a database schema; and
reading annotations provided by a database designer.

27. The non-transitory computer program product of claim 25, wherein the query is translated to relational algebra, and the approximation is computed by interpreting an operator of relational algebra as an operator on graphs representing dependencies between fields of relations.

28. The non-transitory computer program product of claim 25, wherein the graph is annotated with constraints indicating fields whose values are expected to be equal in any record in a relation.

29. The non-transitory computer program product of claim 25, wherein the graph comprises information recording functional dependencies between fields, where the first field is functionally dependent on one or more other fields if the values of the one or more other fields uniquely determine the value of the first field in any record.

30. The non-transitory computer program product of claim 25, wherein the graph is annotated with length constraints, where a length constraint between one field and another field denotes an expected length of a path in a graph with edge relation given by the one field and the other field.

* * * * *